US011059487B2

(12) United States Patent
Tokita

(10) Patent No.: US 11,059,487 B2
(45) Date of Patent: Jul. 13, 2021

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventor: Hiroyuki Tokita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 16/170,894

(22) Filed: Oct. 25, 2018

(65) Prior Publication Data

US 2019/0135284 A1 May 9, 2019

(30) Foreign Application Priority Data

Nov. 7, 2017 (JP) .............................. JP2017-214997

(51) Int. Cl.
*B60W 30/182* (2020.01)
*B60W 40/09* (2012.01)
*B60W 50/00* (2006.01)
*B60L 53/00* (2019.01)

(52) U.S. Cl.
CPC .......... *B60W 30/182* (2013.01); *B60W 40/09* (2013.01); *B60W 50/0098* (2013.01); *B60L 53/00* (2019.02); *B60L 2240/70* (2013.01); *B60L 2250/18* (2013.01); *B60L 2250/20* (2013.01); *B60L 2250/22* (2013.01); *B60L 2260/20* (2013.01); *B60W 2400/00* (2013.01); *B60W 2530/10* (2013.01); *B60W 2540/043* (2020.02); *B60W 2900/00* (2013.01)

(58) Field of Classification Search
CPC .............. B60W 30/182; B60W 40/09; B60W 50/0098; B60W 2540/043; B60W 2400/00; B60W 2530/10; B60W 2900/00; B60W 60/00256; B60L 2260/20; B60L 2240/70; B60L 2250/20; B60L 2250/22; B60L 2250/18; B60L 53/00
See application file for complete search history.

(56) References Cited

U.S. PATENT DOCUMENTS

| 9,332,126 B2* | 5/2016 | Tadayon ............... H04B 5/0062 |
| 2014/0309863 A1* | 10/2014 | Ricci ....................... H04L 67/10 |
| | | 701/36 |
| 2017/0038775 A1* | 2/2017 | Park .................... F02D 41/0007 |

(Continued)

FOREIGN PATENT DOCUMENTS

| JP | H08-337133 A | 12/1996 |
| JP | 2007-122579 A | 5/2007 |

(Continued)

*Primary Examiner* — Aniss Chad
*Assistant Examiner* — Chase L Cooley
(74) *Attorney, Agent, or Firm* — Hunton Andrews Kurth LLP

(57) ABSTRACT

An information processing apparatus includes a processor. The processor is configured to estimate whether a fellow passenger is included in occupants of a vehicle, when the fellow passenger is included in the occupants, acquire information relating to a driver of the vehicle and information relating to the fellow passenger, estimate a relationship between the driver and the fellow passenger based on the acquired information, and select a control relating to traveling of the vehicle according to the relationship.

11 Claims, 21 Drawing Sheets

(56) References Cited

U.S. PATENT DOCUMENTS

| | | | | |
|---|---|---|---|---|
| 2017/0175431 | A1* | 6/2017 | Bradley | G05D 1/0276 |
| 2017/0267256 | A1* | 9/2017 | Minster | B60W 50/082 |
| 2018/0137264 | A1* | 5/2018 | Kurian | G06F 21/32 |
| 2019/0195644 | A1* | 6/2019 | Scheufler | G01C 21/3438 |

FOREIGN PATENT DOCUMENTS

| | | |
|---|---|---|
| JP | 2015-121842 A | 7/2015 |
| JP | 2017-136922 A | 8/2017 |

\* cited by examiner

| STATUS | RANK |
|---|---|
| Very Safety | 5 |
| Safety | 4 |
| Normal | 3 |
| Busy | 2 |
| Very Busy | 1 |

FIG. 10

| NAME | UNIT | DETAILS |
|---|---|---|
| IN-VEHICLE DEVICE ID | — | IN-VEHICLE DEVICE NUMBER (USE AS VEHICLE IDENTIFICATION) |
| VEHICLE POSITION | DEGREE | VEHICLE POSITION (LATITUDE AND LONGITUDE) MEASURED BY GPS |
| VEHICLE DATE AND TIME | | VEHICLE DATE AND TIME (YEAR/MONTH/DAY/HOUR/MINUTE/SECOND) MEASURED BY GPS |
| IGNITION SW | — | IGNITION SWITCH ON/OFF SIGNAL |
| S&S RATIO | % | STOP AND START RATIO |
| ENG RESTART FACTOR HISTORY | — | STOP AND START ⇒ ENG RESTART FACTOR INFORMATION |
| TRAVELING MODE | — | CURRENT VEHICLE TRAVELING MODE |
| ACCELERATOR OPERATION CHARACTERISTIC STATUS | — | PROVIDE STATUS WITH EVALUATION IN FIVE STEPS ACCORDING TO CHARACTERISTIC DIAGRAM |
| VEHICLE SPEED MAINTENANCE CHARACTERISTIC STATUS | — | PROVIDE STATUS WITH EVALUATION IN FIVE STEPS ACCORDING TO CHARACTERISTIC DIAGRAM |
| BRAKE OPERATION CHARACTERISTIC STATUS | — | PROVIDE STATUS WITH EVALUATION IN FIVE STEPS ACCORDING TO CHARACTERISTIC DIAGRAM |

FIG. 11

| MEMBER ID | SEX | AGE | DATE OF BIRTH | ADDRESS | FAMILY COMPOSITION | OCCUPATION | WORK LOCATION | ENTRANCE YEAR | TELEPHONE NUMBER | EMAIL ADDRESS |
|---|---|---|---|---|---|---|---|---|---|---|
| **** | MALE | 10s | // | AA-CITY, AA-PREF. | HIM/HERSELF/SUPPORTER | STUDENT | AA UNIVERSITY | - | MOBILE | @AAAA |
| **** | FEMALE | 10s | // | AA-CITY, AA-PREF. | HIM/HERSELF/SUPPORTER | STUDENT | AA UNIVERSITY | - | MOBILE | @AAAA |
| **** | MALE | 20s | // | BB-CITY, BB-PREF. | HIM/HERSELF | COMPANY EMPLOYEE | BB INC. | **** | MOBILE | @BBBB |
| **** | FEMALE | 20s | // | BB-CITY, BB-PREF. | HIM/HERSELF | COMPANY EMPLOYEE | BB INC. | **** | MOBILE | @BBBB |
| **** | MALE | 30s | // | CC-CITY, CC-PREF. | HIM/HERSELF | COMPANY EMPLOYEE | CC INC. | **** | MOBILE/LANDLINE | @CCCC |
| **** | FEMALE | 30s | // | CC-CITY, CC-PREF. | HIM/HERSELF | COMPANY EMPLOYEE | CC INC. | **** | MOBILE/LANDLINE | @CCCC |
| **** | MALE | 40s | // | DD-CITY, DD-PREF. | HIM-HERSELF SPOUSE (WIFE/CHILD) | COMPANY EMPLOYEE | DD INC. | **** | MOBILE/LANDLINE | @DDDD |
| **** | FEMALE | 40s | // | DD-CITY, DD-PREF. | HIM/HERSELF/SUPPORTER (HUSBAND/CHILD) | HOMEMAKER | HOME | - | MOBILE/LANDLINE | @DDDD |
| **** | MALE | 50s | // | EE-CITY, EE-PREF. | HIM/HERSELF SPOUSE (WIFE/CHILD) | COMPANY EMPLOYEE | EE INC. | **** | MOBILE/LANDLINE | @EEEE |
| **** | FEMALE | 50s | // | EE-CITY, EE-PREF. | HIM/HERSELF/SUPPORTER (HUSBAND/CHILD) | PART-TIMER | EE STORE | **** | MOBILE/LANDLINE | @EEEE |
| **** | MALE | 60s | // | FF-CITY, FF-PREF. | HIM/HERSELF SPOUSE (WIFE) | COMPANY EMPLOYEE | FF INC. | **** | MOBILE/LANDLINE | @FFFF |
| **** | FEMALE | 60s | // | FF-CITY, FF-PREF. | HIM/HERSELF/SUPPORTER (HUSBAND) | HOMEMAKER | HOME | - | MOBILE/LANDLINE | @FFFF |
| **** | MALE | 70s | // | GG-CITY, GG-PREF. | HIM/HERSELF SPOUSE (WIFE) | SELF-EMPLOYED | GG STORE | **** | MOBILE/LANDLINE | @GGGG |
| **** | FEMALE | 70s | // | GG-CITY, GG-PREF. | HIM/HERSELF/SUPPORTER (HUSBAND) | SELF-EMPLOYED | GG STORE | **** | MOBILE/LANDLINE | @GGGG |

| SEX | AGE | ADDRESS | DATING STATUS | DATE OF START DATING |
|---|---|---|---|---|
| MALE | 30s | BB-CITY, AA-PREF. | KEEPING DATING | 06/2015 |
| FEMALE | 30s | BB-CITY, AA-PREF. | KEEPING DATING | 06/2015 |

| VEHICLE INFORMATION | START POSITION INFORMATION | DRIVER ID | FELLOW PASSENGER ID | RELATIONSHIP STATUS |
|---|---|---|---|---|
| ... | ... | ... | ... | ... |
| ... | ... | ... | ... | ... |
| : | : | : | : | : |

| DAY OF WEEK | TIME SLOT | START POSITION INFORMATION | | END POSITION INFORMATION | | ENG RESTART FACTOR FREQUENCY | | | ESTIMATED DESTINATION | S&S RATIO | DRIVER ID | FELLOW PASSENGER ID | RELATIONSHIP STATUS | TRAVELING MODE (CURRENT TRIP) | TRAVELING MODE (NEXT TRIP) ~155 |
|---|---|---|---|---|---|---|---|---|---|---|---|---|---|---|---|
| | | LATITUDE | LONGITUDE | LATITUDE | LONGITUDE | BATTERY FACTOR | BRAKE FACTOR | AIR CONDITIONER FACTOR | | | | | | | |
| WEEKDAY | 0:00 TO 4:59 | - | - | - | - | - | - | - | - | - | - | - | - | - | |
| | 5:00 TO 8:59 | 137 | 34 | 137 | 35 | 0 | 0 | 5 | WORKPLACE | 50% | 111111 | - | SINGLE | 50-50 MODE | |
| | 9:00 TO 11:59 | 137 | 35 | 138 | 34 | 2 | 2 | 10 | BUSINESS TRIP DESTINATION | 30% | 111111 | 222222 | BUSINESS | COMFORT PRIORITY MODE | |
| | 12:00 TO 15:59 | 138 | 34 | 138 | 34 | 0 | 0 | 2 | LUNCH | 20% | 111111 | 222222 | BUSINESS | COMFORT PRIORITY MODE | |
| | 16:00 TO 19:59 | 138 | 34 | 137 | 35 | 2 | 2 | 10 | WORKPLACE | 30% | 111111 | 222222 | BUSINESS | COMFORT PRIORITY MODE | |
| | 20:00 TO 23:59 | 137 | 35 | 137 | 34 | 0 | 0 | 5 | HOME | 50% | 111111 | - | SINGLE | 50-50 MODE | |
| HOLIDAY | 0:00 TO 4:59 | - | - | - | - | - | - | - | - | - | - | - | - | - | |
| | 5:00 TO 8:59 | - | - | - | - | - | - | - | - | - | - | - | - | - | |
| | 9:00 TO 11:59 | 137 | 34 | 136 | 35 | 5 | 15 | 5 | SHOPPING CENTER | 20% | 111111 | - | SINGLE | COMFORT PRIORITY MODE | |
| | 12:00 TO 15:59 | - | - | - | - | - | - | - | - | - | - | - | - | - | |
| | 16:00 TO 19:59 | 136 | 35 | 137 | 34 | 2 | 5 | 5 | HOME | 50% | 111111 | - | SINGLE | 50-50 MODE | |
| | 20:00 TO 23:59 | - | - | - | - | - | - | - | - | - | - | - | - | - | |

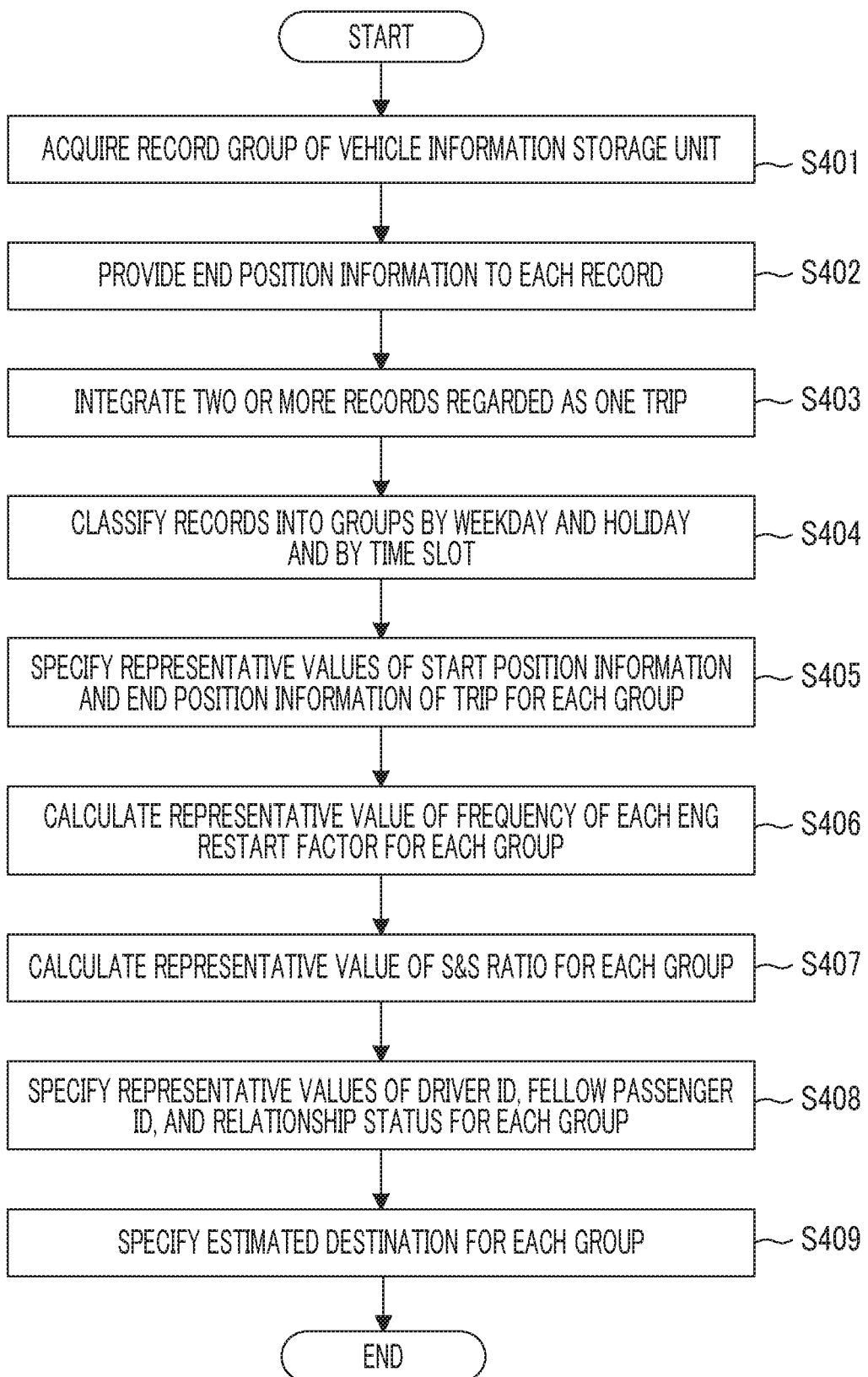

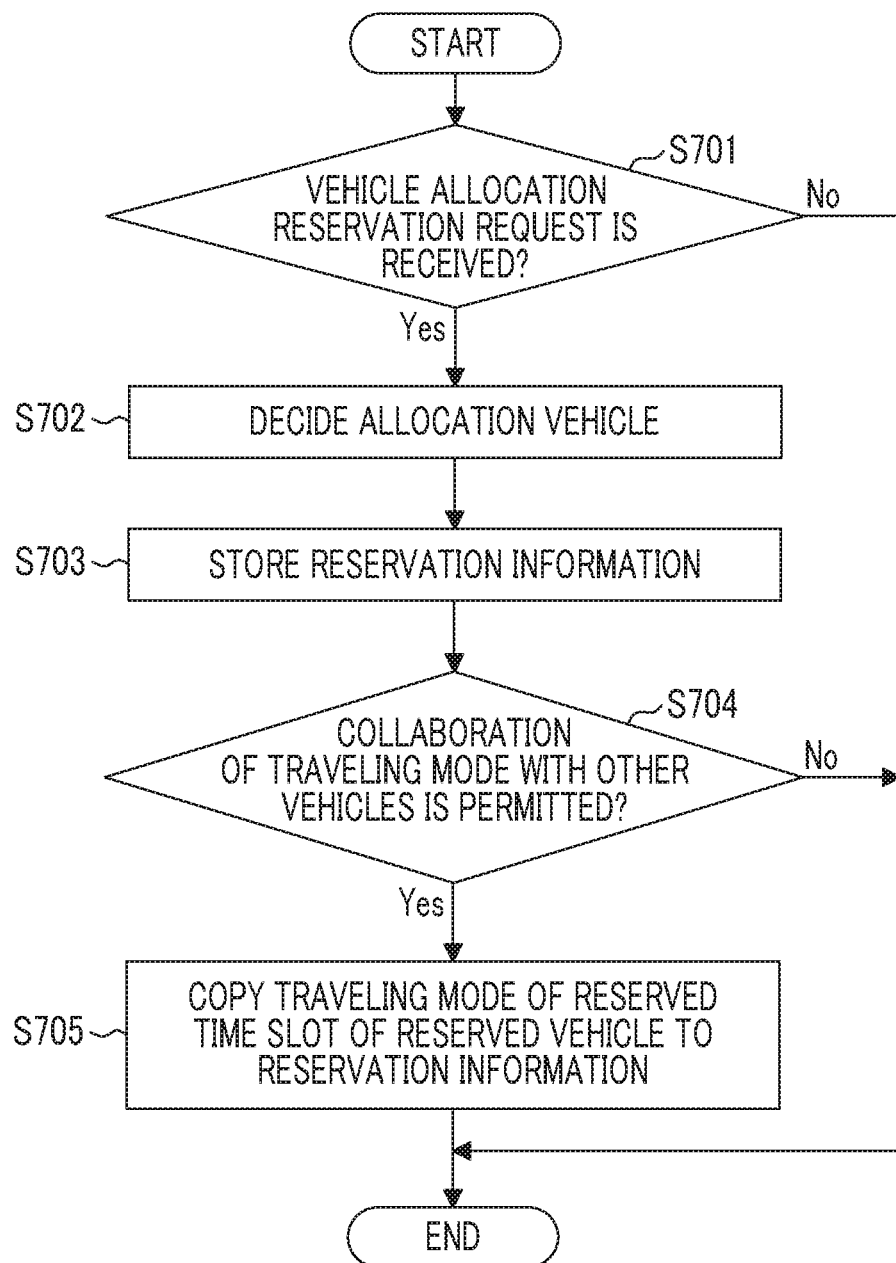

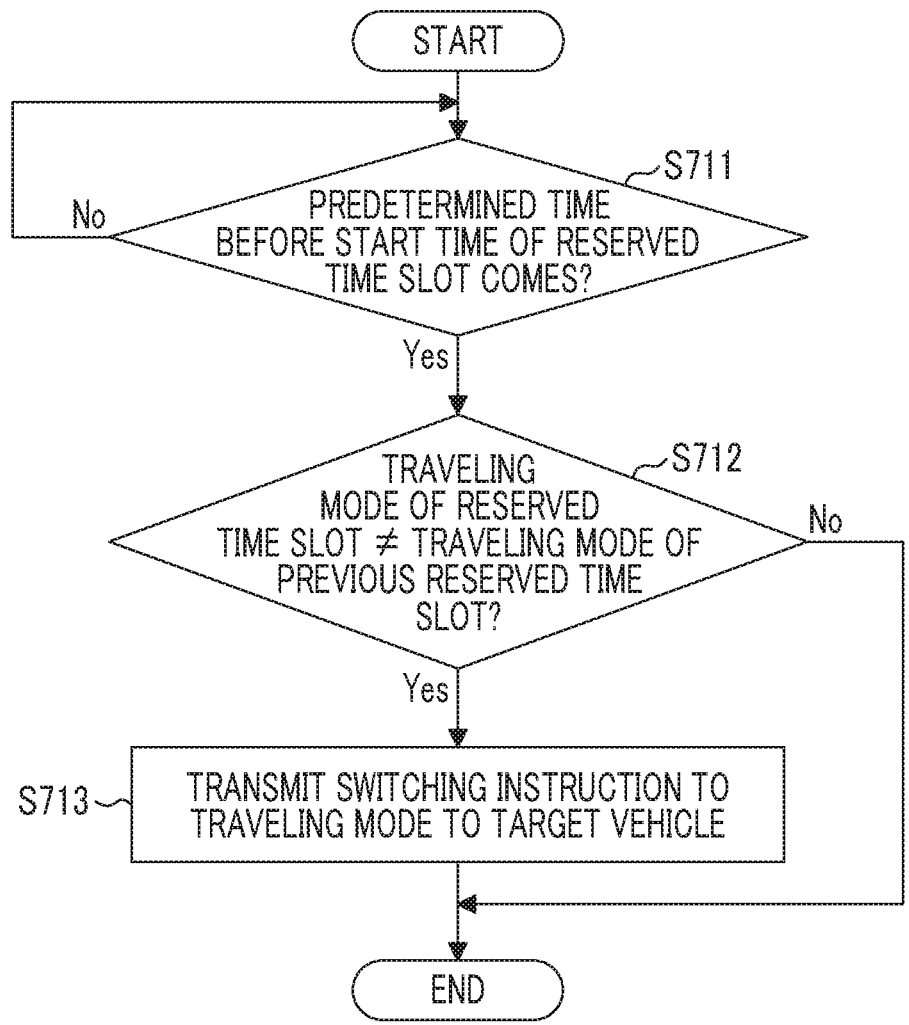

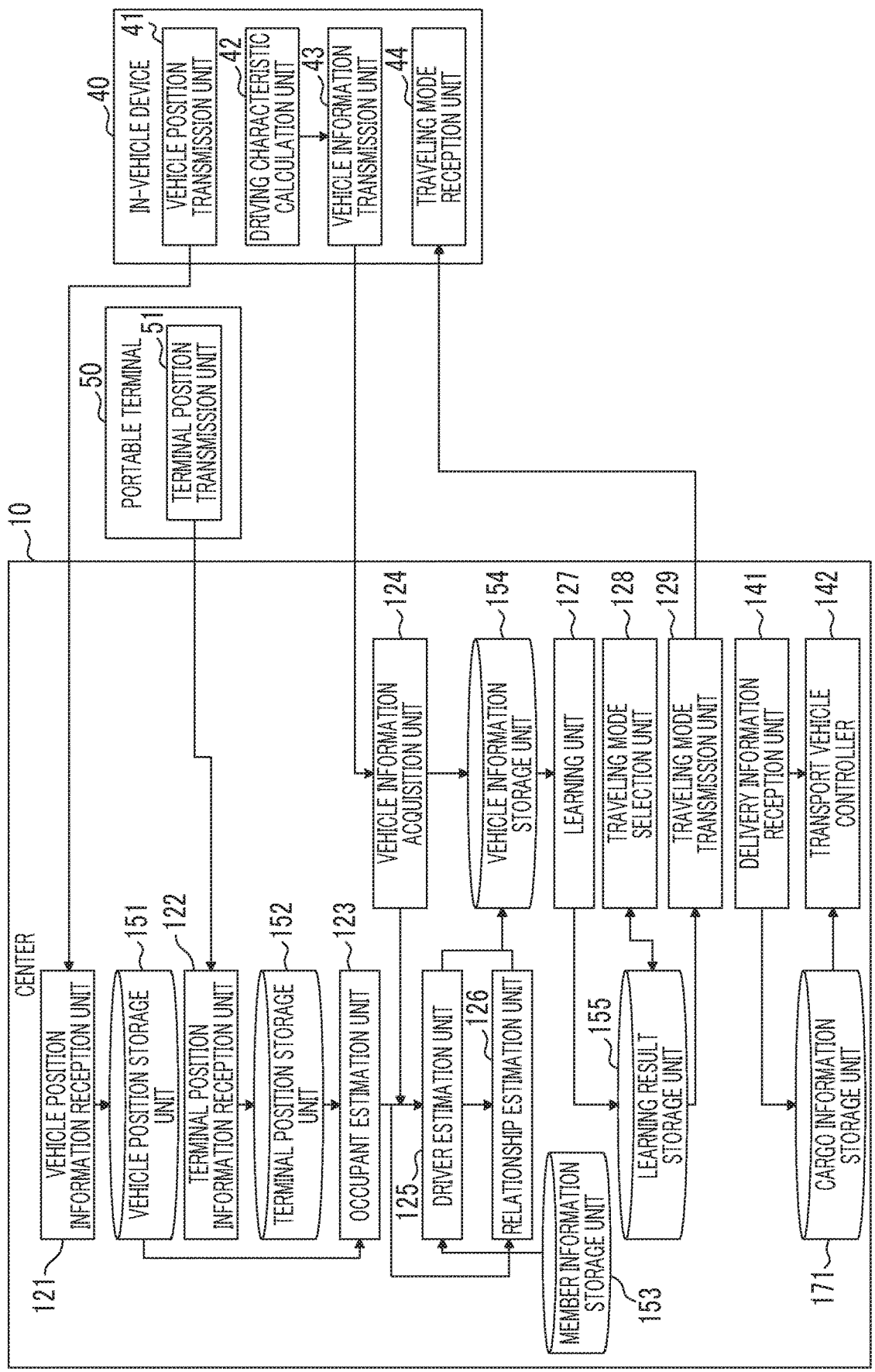

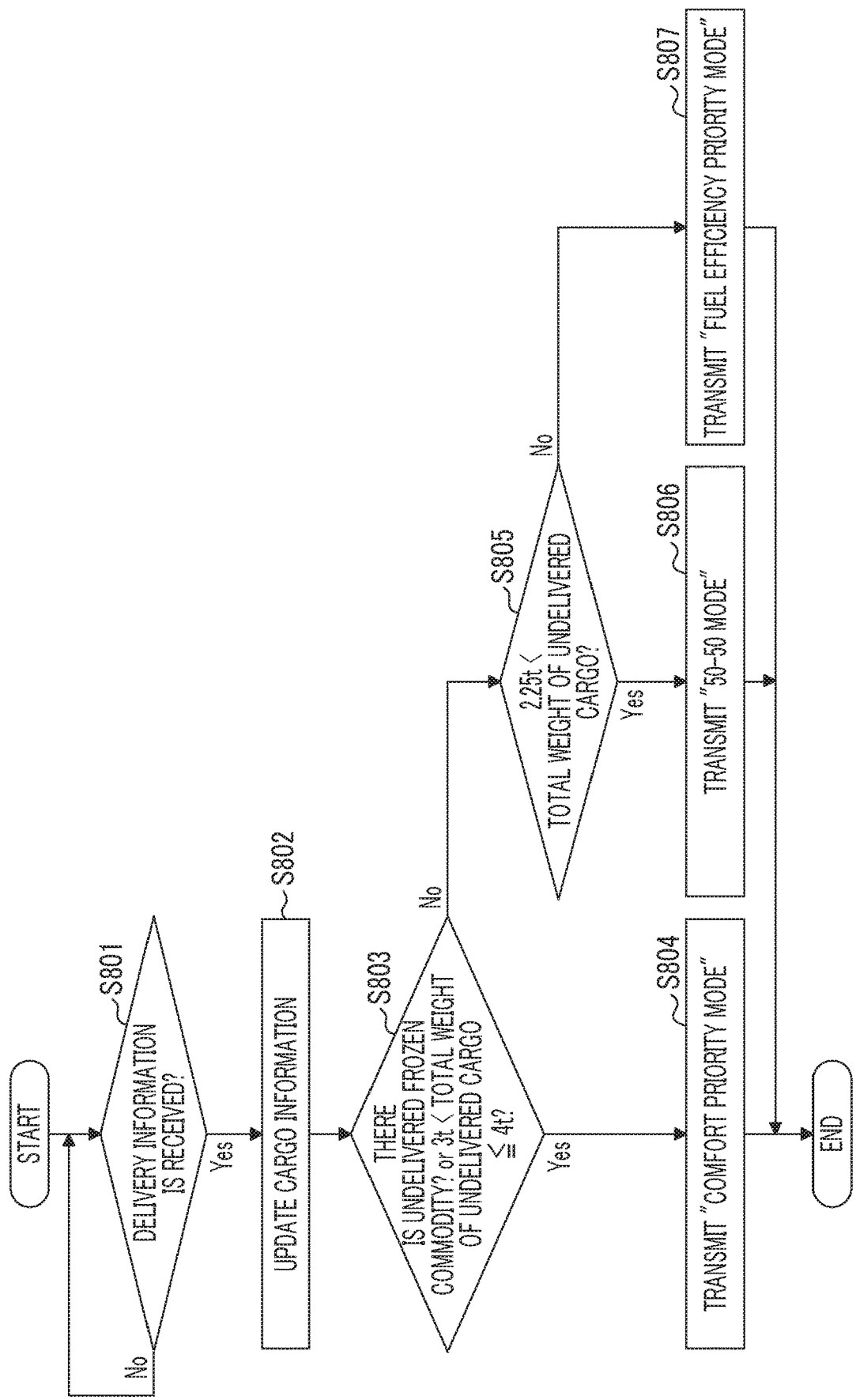

INFORMATION PROCESSING APPARATUS AND INFORMATION PROCESSING METHOD

INCORPORATION BY REFERENCE

The disclosure of Japanese Patent Application No. 2017-214997 filed on Nov. 7, 2017 including the specification, drawings and abstract is incorporated herein by reference in its entirety.

BACKGROUND

1. Technical Field

The present disclosure relates to an information processing apparatus and an information processing method.

2. Description of Related Art

A technique that performs driving assistance of a vehicle based on an attribute of a fellow passenger of the vehicle has been suggested (for example, see Japanese Unexamined Patent Application Publication No. 2015-121842 (JP 2015-121842 A)). According to the technique, it is possible to provide a comfortable ride to the fellow passenger.

SUMMARY

However, in the technique, a relationship between a driver and the fellow passenger is not taken into consideration. Accordingly, for example, it is not possible to change traveling control of the vehicle according to a case where the driver and the fellow passenger are friends, a family, co-workers, or the like.

The disclosure provides an information processing apparatus and an information processing method that enable traveling control of a vehicle based on a relationship between a driver and a fellow passenger.

A first aspect of the disclosure relates to an information processing apparatus including a processor. The processor is configured to estimate whether or not a fellow passenger is included in occupants of a vehicle, when the fellow passenger is included in the occupants, acquire information relating to a driver of the vehicle and information relating to the fellow passenger and estimate a relationship between the driver and the fellow passenger based on the acquired information, and select a control relating to traveling of the vehicle according to the relationship.

For this reason, when the fellow passenger is present, the control relating to traveling of the vehicle is performed based on the relationship between the driver and the fellow passenger.

According to the first aspect of the disclosure, it is possible to enable the traveling control of the vehicle based on the relationship between the driver and the fellow passenger.

In the information processing apparatus according to the first aspect of the disclosure, the processor may be configured to further receive positional information of the vehicle from an in-vehicle device mounted in the vehicle and receive, from a plurality of portable terminals, positional information of the portable terminals. The processor may be configured to estimate the occupants based on the positional information of the vehicle and the positional information of the portable terminals.

For this reason, it is possible to automatically estimate the presence or absence of a fellow passenger.

According to the first aspect of the disclosure, it is possible to enable the traveling control of the vehicle based on the relationship between the driver and the fellow passenger.

The information processing apparatus according to the first aspect of the disclosure may further include a storage unit configured to store information indicating a driving characteristic acquired from the vehicle and information indicating a driving characteristic for each of the occupants. The processor may be configured to estimate a driver from among the occupants based on information stored in the storage unit.

For this reason, it is possible to increase estimation accuracy about which of the occupants is the driver.

According to the first aspect of the disclosure, it is possible to enable the traveling control of the vehicle based on the relationship between the driver and the fellow passenger.

In the information processing apparatus according to the first aspect of the disclosure, the processor may be configured to estimate the relationship between the driver and the fellow passenger based on commonality between personal information relating to the driver and personal information relating to the fellow passenger or based on a content of an address book stored in the portable terminal of each of the driver and the fellow passenger.

For this reason, it is possible to increase the estimation accuracy of the relationship between the driver and the fellow passenger based on the address book.

According to the first aspect of the disclosure, it is possible to enable the traveling control of the vehicle based on the relationship between the driver and the fellow passenger.

In the information processing apparatus according to the first aspect of the disclosure, the relationship may be one of a family, a friend, a dating partner, and a co-worker.

For this reason, it is possible to change the traveling control of the vehicle according to whether the relationship between the driver and the fellow passenger is one of the family, the friend, the dating partner, and the co-worker.

According to the first aspect of the disclosure, it is possible to enable the traveling control of the vehicle based on the relationship between the driver and the fellow passenger.

In the information processing apparatus according to the first aspect of the disclosure, the processor may be configured to, when the relationship is the family, select a control of the vehicle based on whether or not an infant or an aged person is included in the fellow passenger.

For this reason, it is possible to perform traveling control appropriate for an infant or an aged person when an infant or an aged person is together in the vehicle.

According to the first aspect of the disclosure, it is possible to enable the traveling control of the vehicle based on the relationship between the driver and the fellow passenger.

In the information processing apparatus according to the first aspect of the disclosure, the processor may be configured to, when the relationship is the friend or the dating partner, select a control of the vehicle based on a degree of intimacy between the driver and the fellow passenger.

For this reason, it is possible to perform traveling control according to the degree of intimacy between the driver and the fellow passenger.

According to the first aspect of the disclosure, it is possible to enable the traveling control of the vehicle based on the relationship between the driver and the fellow passenger.

In the information processing apparatus according to the first aspect of the disclosure, the processor may be configured to, when the relationship is the co-worker, select a control of the vehicle based on a pecking order of the driver and the fellow passenger.

For this reason, it is possible to perform traveling control according to the pecking order of the driver and the fellow passenger.

According to the first aspect of the disclosure, it is possible to enable the traveling control of the vehicle based on the relationship between the driver and the fellow passenger.

In the information processing apparatus according to the first aspect of the disclosure, the storage unit may be configured to store a relationship status between the driver and the fellow passenger in each time slot of a weekday and a holiday. The processor may be configured to determine the relationship between the driver and the fellow passenger based on the relationship status in a target time slot.

In the information processing apparatus according to the first aspect of the disclosure, the control relating to traveling of the vehicle may include a fuel efficiency priority mode in which high fuel efficiency is given priority, a comfort priority mode in which comfort of the occupants is given priority, a 50-50 mode that is a control intermediate between the fuel efficiency priority mode and the comfort priority mode, and a charging mode in which charging of a battery is given priority.

In the information processing apparatus according to the first aspect of the disclosure, the processor may be configured to receive a vehicle allocation reservation request from a portable terminal of a member, when the vehicle allocation reservation request is received, store a reservation information in the storage unit, determine whether or not collaboration with other vehicles is permitted with respect to the member included in the vehicle allocation reservation request, and when it is determined that the collaboration is permitted, copy a control relating to traveling of a vehicle corresponding to the member of a reserved time slot to the reservation information.

In the information processing apparatus according to the first aspect of the disclosure, the processor may be configured to receive cargo delivery information with the vehicle from the portable terminals of the occupants and update cargo information of the vehicle. The processor may be configured to select a control of the vehicle based on a situation of an undelivered cargo.

In the information processing apparatus according to the first aspect of the disclosure, the processor may be configured to, as the control of the vehicle, i) select a comfort priority mode in which comfort of the occupants are given priority when a frozen commodity is included in the undelivered cargo or when a total weight of the undelivered cargo is within a predetermined range, ii) select a fuel efficiency priority mode in which high fuel efficiency is given priority when the frozen commodity is not included in the undelivered cargo, the total weight is outside the predetermined range, and the total weight is equal to or less than a first predetermined value, and iii) select a 50-50 mode that is a control intermediate between the fuel efficiency priority mode and the comfort priority mode when the frozen commodity is not included in the undelivered cargo, the total weight is outside the predetermined range, and the total weight is greater than the first predetermined value.

A second aspect of the disclosure relates to an information processing method that a computer executes. The information processing method includes estimating whether or not a fellow passenger is included in occupants of a vehicle, when the fellow passenger is included in the occupants, acquiring information relating to a driver of the vehicle and information relating to the fellow passenger and estimating a relationship between the driver and the fellow passenger based on the acquired information; and selecting a control relating to traveling of the vehicle according to the relationship.

For this reason, when a fellow passenger is present, the control relating to traveling of the vehicle is performed based on the relationship between the driver and the fellow passenger.

According to the second aspect of the disclosure, it is possible to enable the traveling control of the vehicle based on the relationship between the driver and the fellow passenger.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a diagram showing a configuration example of vehicle information;

FIG. 11 is a diagram showing a configuration example of personal information;

FIG. 15 is a diagram showing a configuration example of a learning result storage unit;

FIG. 16 is a flowchart illustrating an example of a processing procedure of learning processing of a traveling pattern;

FIG. 20 is a flowchart illustrating an example of a processing procedure that a center executes at the time of reservation of vehicle allocation according to the third embodiment.

FIG. 21 is a diagram showing a configuration example of reservation information.

FIG. 22 is a flowchart illustrating an example of a processing procedure that an allocation vehicle controller executes according to the third embodiment;

FIG. 23 is a diagram showing a functional configuration example of each device according to a fourth embodiment; and FIG. 24 is a flowchart illustrating an example of a processing procedure that a center executes according to the fourth embodiment.

DETAILED DESCRIPTION OF EMBODIMENTS

Figure 1:
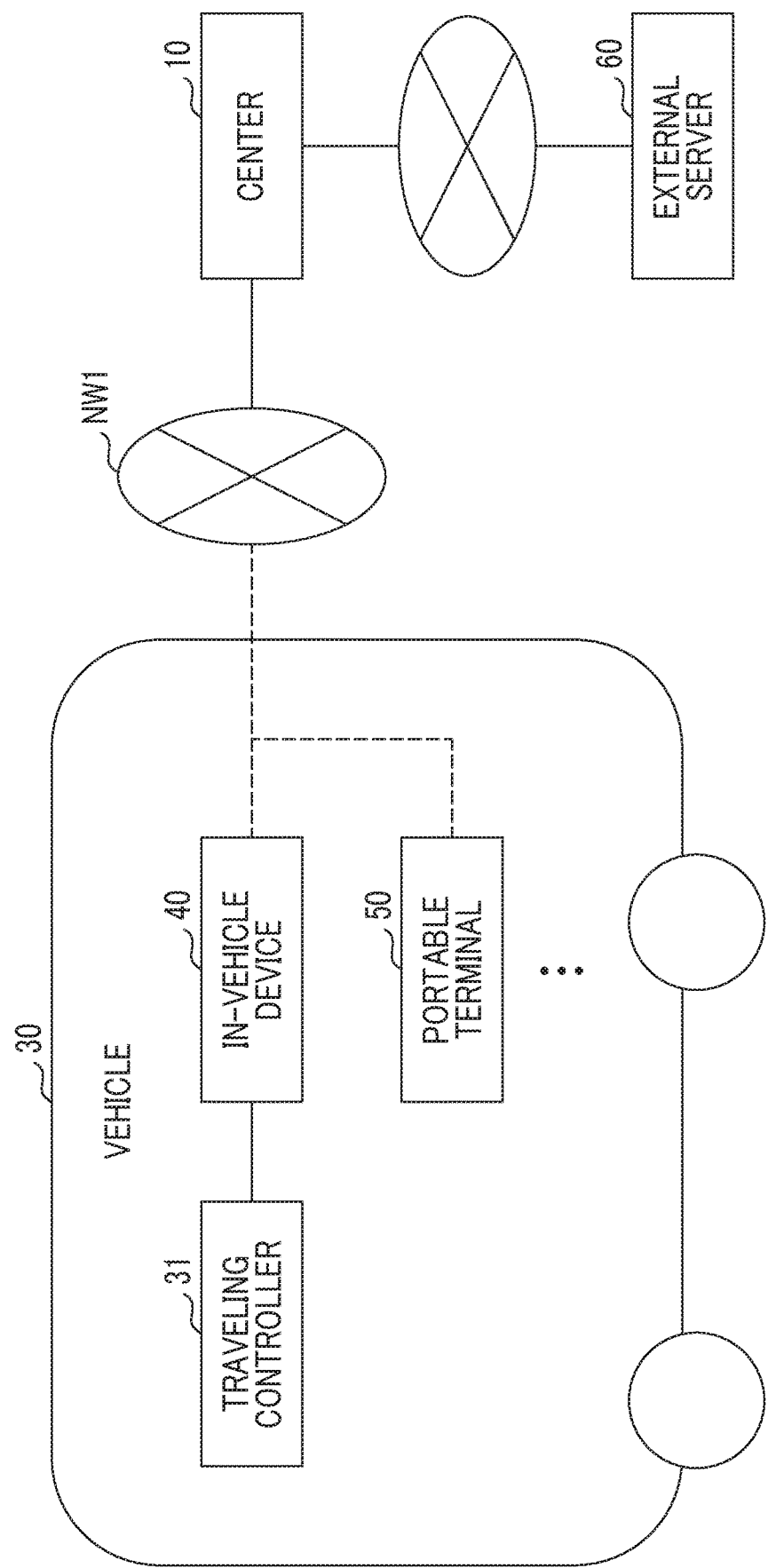
FIG. 1 is a diagram showing a system configuration example according to a first embodiment.

Hereinafter, a first embodiment will be described referring to the drawings. FIG. 1 is a diagram showing a system configuration example according to the first embodiment. In FIG. 1, an in-vehicle device 40 can perform communication with portable terminals 50 and a center 10 through a predetermined communication network NW1 including a mobile communication network that is a wireless communication network with a large number of base stations as terminals, the Internet network, or the like.

The in-vehicle device 40 is a device that is mounted in a vehicle 30 as an automobile, and has an information processing function and a communication function. For example, the in-vehicle device 40 may include a navigation system. In the embodiment, the in-vehicle device 40 transmits positional information of a current position of the vehicle 30, vehicle information including a parameter group collected from sensors of the vehicle 30, a driving characteristic status as information indicating a driver's characteristic of driving of the vehicle 30, or the like to the center 10. The in-vehicle device 40 receives traveling mode information to be transmitted from the center 10, and makes a traveling controller 31 execute traveling control according to a traveling mode indicated by the traveling mode information.

The traveling controller 31 is a computer group that controls traveling of the vehicle 30. In the embodiment, the traveling controller 31 performs traveling control according to a traveling mode.

In the embodiment, the traveling mode is an example of a method of the traveling control of the vehicle 30, and is classified into, for example, "fuel efficiency priority mode", "comfort priority mode", "50-50 mode", "charging mode", and the like. The "fuel efficiency priority mode" is a control (a control method) in which fuel efficiency is given priority. The "comfort priority mode" is a control in which comfort of an occupant is given priority. The "50-50 mode" is a control intermediate between the "fuel efficiency priority mode" and the "comfort priority mode". The "charging mode" is a control in which charging of a battery is given priority. In the embodiment, the traveling modes are changed through settings to the traveling controller 31 by the in-vehicle device 40, instead of being changeable through operation of switches inside the vehicle 30. However, traveling modes that are changeable through operation of switches or the like inside the vehicle 30 may be controlled.

The portable terminals 50 are terminals that are carried with a driver, a fellow passenger, and the like (that is, occupants of the vehicle 30). For example, smartphones, mobile phones, or the like may be used as the portable terminals 50. Each portable terminal 50 transmits current position information or the like of the portable terminal 50 to the center 10.

In FIG. 1, although solely one vehicle 30 is shown, the in-vehicle devices 40 that are mounted in a plurality of vehicles 30, or the portable terminals 50 of the occupants of each vehicle 30 can perform communication with the center 10.

The center 10 is a group of one or more computers (information processing apparatuses). In the embodiment, the center 10 provides a service (hereinafter, referred to as a "traveling mode optimization service") in which a traveling mode appropriate for the vehicle 30 is determined based on the relationship between the driver and the fellow passenger of the vehicle 30, and traveling mode information including the traveling mode is transmitted to the vehicle 30.

In FIG. 1, the center 10 is connected to an external server 60 through a network, such as the Internet. The external server 60 is a computer group that has personal information or the like of each of users of the portable terminals 50. For example, a server that provides a social networking service (SNS) may be used as the external server 60. This is because personal information of the users of the SNS is managed in the server.

Figure 2:
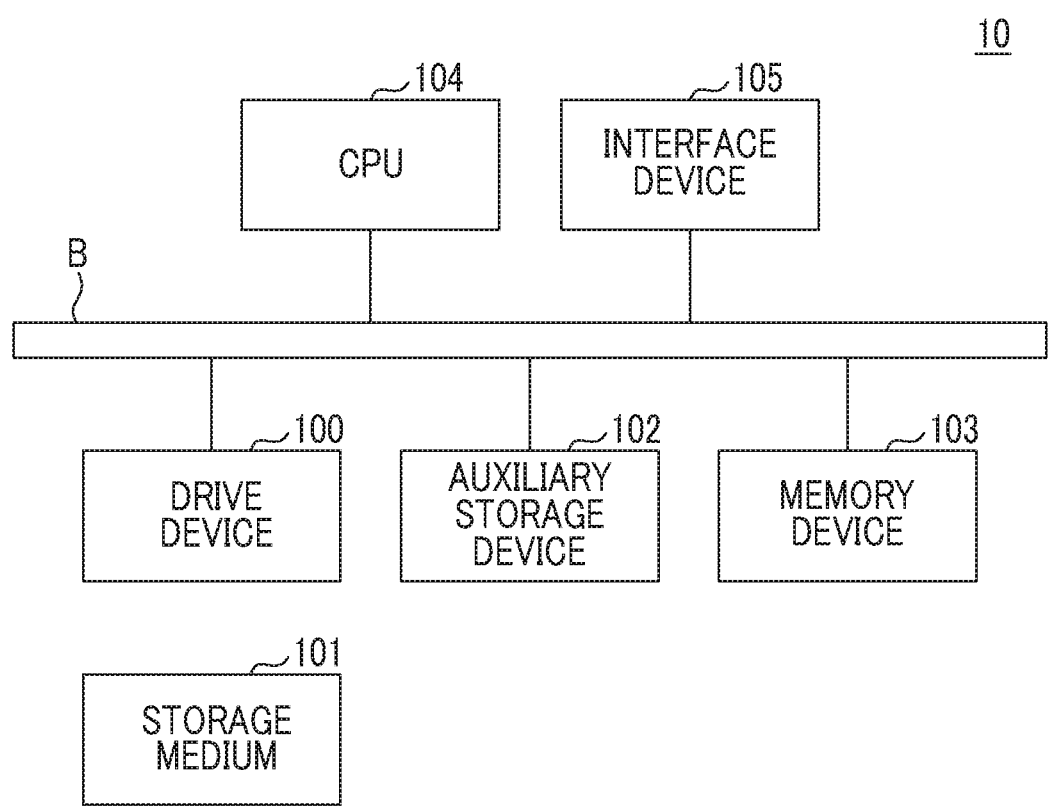
FIG. 2 is a diagram showing a hardware configuration example of a center according to the first embodiment.

FIG. 2 is a diagram showing a hardware configuration example of the center 10 according to the first embodiment. The center 10 of FIG. 2 has a drive device 100, an auxiliary storage device 102, a memory device 103, a central processing unit (CPU) 104, an interface device 105, and the like that are connected to one another through a bus B.

A program that realizes processing in the center 10 is provided by a storage medium 101, such as a compact disc-read only memory (CD-ROM). When the storage medium 101 storing the program is set in the drive device 100, the program is installed from the storage medium 101 to the auxiliary storage device 102 through the drive device 100. However, the installation of the program is not indispensably performed from the storage medium 101, and may be downloaded from another computer through the network. The auxiliary storage device 102 stores the installed program, and stores needed files, data, and the like.

The memory device 103 reads and stores the program from the auxiliary storage device 102 in a case where there is a start instruction of the program. The CPU 104 executes functions related to the center 10 according to the program stored in the memory device 103. The interface device 105 is used as an interface for connection to the network.

Figure 3:
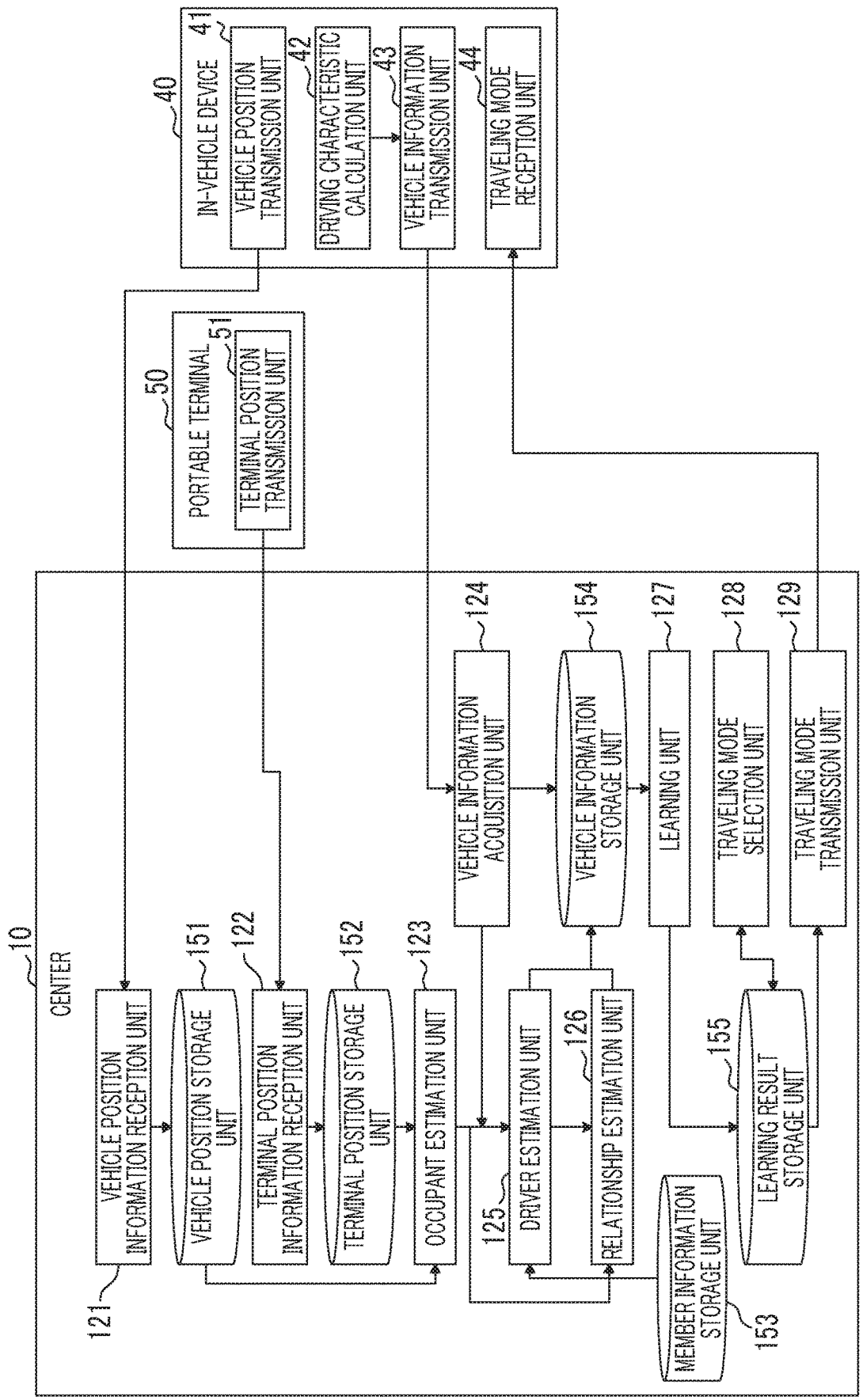
FIG. 3 is a diagram showing a functional configuration example of each device according to the first embodiment.

FIG. 3 is a diagram showing a functional configuration example of each device according to the first embodiment. In FIG. 3, the in-vehicle device 40 has a vehicle position transmission unit 41, a driving characteristic calculation unit 42, a vehicle information transmission unit 43, a traveling mode reception unit 44, and the like. The above-described units are realized by processing that is executed on the CPU of the in-vehicle device 40 by one or more programs installed on the in-vehicle device 40.

The vehicle position transmission unit 41 transmits positional information (latitude and longitude) of the vehicle 30 to the center 10 when ignition of the vehicle 30 is ON or OFF (or when an accessory power supply is ON or OFF). The positional information of the vehicle 30 is hereinafter also referred to as "vehicle position information". The vehicle position information is measured by, for example, a global positioning system (GPS) function that is provided in the in-vehicle device 40. The vehicle position information further includes an in-vehicle device ID that is identification information of each vehicle 30 (or each in-vehicle device 40), and date and time when the vehicle position information is measured.

The driving characteristic calculation unit 42 calculates a driving characteristic status that is a numerical value indicating a characteristic or a feature of driving (hereinafter, referred to as a "driving characteristic") of the driver based on a driving operation of the driver during traveling of the vehicle 30.

The vehicle information transmission unit 43 transmits vehicle information including the parameter group measured by various sensors or the like that are provided in the vehicle 30 and the driving characteristic status calculated by the driving characteristic calculation unit 42 to the center 10 according to a request from the center 10.

The traveling mode reception unit 44 receives information indicating a traveling mode selected in the center 10 and requests the traveling controller 31 for control according to the traveling mode.

Each portable terminal 50 has a terminal position transmission unit 51. The terminal position transmission unit 51 is realized by processing that is executed on a CPU of the portable terminal 50 by one or more programs installed on the portable terminal 50. The terminal position transmission unit 51 transmits positional information (latitude and longitude) of the portable terminal 50 to the center 10 at regular time intervals or each time a position of the portable terminal 50 is changed by a given amount. The positional information of the portable terminal 50 is hereinafter also referred to as "terminal position information". The terminal position information is measured by, for example, a global positioning system (GPS) function that is provided in the portable terminal 50. The terminal position information further includes identification information for identifying the user of each portable terminal 50 on the center 10 side, and date and time when the terminal position information is measured. In the embodiment, as the identification information, a member ID for the traveling mode optimization service is used. That is, the user of each portable terminal 50 is given a member ID by making a use contract of the traveling mode optimization service in advance. The member ID is stored in the portable terminal 50.

The center 10 has a vehicle position information reception unit 121, a terminal position information reception unit 122, an occupant estimation unit 123, a vehicle information acquisition unit 124, a driver estimation unit 125, a relationship estimation unit 126, a learning unit 127, a traveling mode selection unit 128, a traveling mode transmission unit 129, and the like. The above-described units are realized by processing that is executed on the CPU 104 by one or more programs installed on the center 10. The center 10 uses a vehicle position storage unit 151, a terminal position storage unit 152, a member information storage unit 153, a vehicle information storage unit 154, a learning result storage unit 155, and the like. The above-described storage units can be realized, for example, using storage devices or the like that are connectable to the auxiliary storage device 102 or the center 10 through the network.

The vehicle position information reception unit 121 receives the vehicle position information transmitted from the vehicle position transmission unit 41, and stores the received vehicle position information in the vehicle position storage unit 151 by in-vehicle device ID included in the vehicle position information. Accordingly, in the vehicle position storage unit 151, a history of the vehicle position information of the vehicle 30 related to the in-vehicle device ID is stored for each in-vehicle device ID.

The terminal position information reception unit 122 receives the terminal position information transmitted from the terminal position transmission unit 51, and stores the received terminal position information in the terminal position storage unit 152 by member ID included in the terminal position information. Accordingly, in the terminal position storage unit 152, a history of the terminal position information of the portable terminal 50 related to the member ID is stored for each member ID.

The occupant estimation unit 123 estimates the occupants of each vehicle 30 based on the history of the vehicle position information stored in the vehicle position storage unit 151 for each vehicle 30 and the history of the terminal position information stored in the terminal position storage unit 152 for each portable terminal 50 (for each member ID).

The vehicle information acquisition unit 124 acquires the vehicle information from each vehicle 30. The acquired vehicle information is stored in the vehicle information storage unit 154 by in-vehicle device ID.

The driver estimation unit 125 estimates a driver from among the occupants estimated by the occupant estimation unit 123 on each vehicle 30. A member ID of a driver estimated on a certain vehicle 30 is stored in the vehicle information storage unit 154 in association with the vehicle information of the vehicle 30. In estimating a driver of a certain vehicle 30, the driving characteristic status relating to the vehicle 30 is used. That is, a driver is estimated by comparing the driving characteristic status included in the vehicle information acquired from the in-vehicle device 40 of the vehicle 30 by the vehicle information acquisition unit 124, and a past driving characteristic status stored in the member information storage unit 153 concerning each occupant estimated on the vehicle 30. In the member information storage unit 153, information (hereinafter, referred to as "member information") relating to each member of the traveling mode optimization service is stored. The driving characteristic status constitutes a part of the member information.

The relationship estimation unit 126 estimates the relationship (or the relation) between the driver of each vehicle 30 and an occupant (that is, a fellow passenger) other than the driver. The relationship is, for example, a family, a friend, a dating partner, a co-worker, or the like. The estimation of the relationship is performed based on the personal information of the driver and each fellow passenger. The personal information may be included in the member information or may be acquired from the external server 60. A relationship estimated on a certain vehicle 30 is stored in the vehicle information storage unit 154 in association with the vehicle information of the vehicle 30.

The acquisition of the vehicle information, the estimation of the driver, and the estimation of the relationship are performed on each vehicle 30 for each trip. Accordingly, in the vehicle information storage unit 154, the vehicle information, the member ID of the driver, and the relationship are stored by in-vehicle device ID for each trip. The trip refers to a traveling unit of the vehicle 30 from a departure place to a destination, and is basically a period from when ignition is ON (or the accessory power supply is ON) until ignition is OFF (or the accessory power supply is OFF). However, for example, in a case where a stopover occurs in a convenience store, a service area, or the like on the way to the destination, and the unit of the trip is not delimited by parking for a stopover. Parking at the destination or parking for a stopover may be determined based on a parking duration. That is, when the parking duration is less than a predetermined time, determination may be made to be parking for a stopover.

The learning unit 127 learns a traveling pattern of the vehicle 30 based on information stored in the vehicle information storage unit 154 on each vehicle 30. The traveling pattern of the vehicle 30 is information that is constituted by an estimated destination in each time slot by weekday and holiday, the relationship between the driver and the fellow passenger, an average value of the value of a part of the parameters constituting the vehicle information, and the like. The learning unit 127 stores a learning result (traveling pattern) in the learning result storage unit 155.

The traveling mode selection unit 128 selects a traveling mode appropriate for the vehicle 30 in each time slot by weekday and holiday based on the traveling pattern stored in the learning result storage unit 155 on each vehicle 30.

The traveling mode transmission unit 129 transmits traveling mode information indicating the traveling mode in each time slot by weekday and holiday based on a selection result of the traveling mode selection unit 128 to each vehicle 30. The traveling mode information is used in subsequent trips in each vehicle 30.

Figure 4:
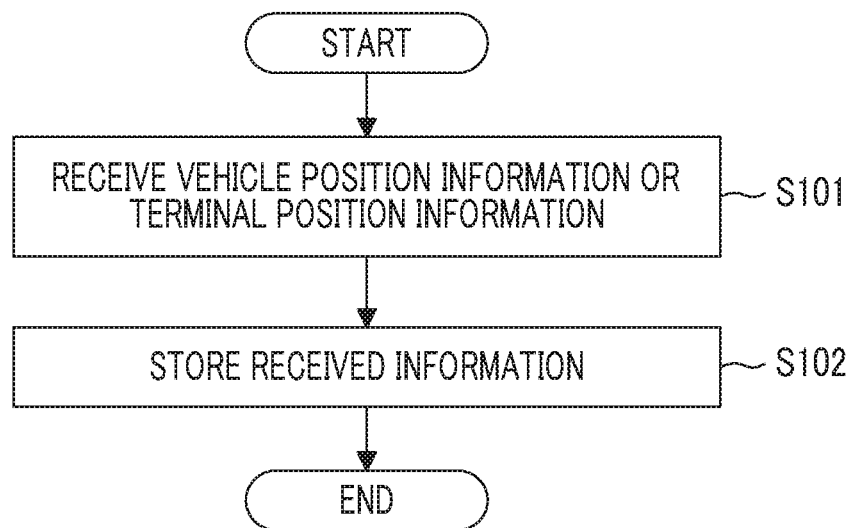
FIG. 4 is a flowchart illustrating an example of a processing procedure that a center executes with reception of vehicle position information or terminal position information.

Hereinafter, a processing procedure that the center 10 executes will be described. FIG. 4 is a flowchart illustrating an example of a processing procedure that the center 10 executes with reception of the vehicle position information or the terminal position information.

In Step S101, the vehicle position information reception unit 121 or the terminal position information reception unit 122 receives the positional information transmitted from the vehicle position transmission unit 41 of any in-vehicle device 40 or the terminal position transmission unit 51 of any portable terminal 50.

In a case where the vehicle position information reception unit 121 receives the vehicle position information (S101), the vehicle position information reception unit 121 stores the vehicle position information in the vehicle position storage unit 151 by in-vehicle device ID included in the vehicle position information (S102). When ignition of the vehicle 30 is ON or OFF, each in-vehicle device 40 transmits the positional information of the in-vehicle device 40 (the vehicle 30) to the center 10. Accordingly, in the vehicle position storage unit 151, vehicle position information at a start point of a trip and vehicle position information at an end point of the trip are stored in time series on each vehicle 30. Hereinafter, in a case where there is a need for distinction between the vehicle position information at the start point and the vehicle position information at the end point, the former is referred to as "start position information", and the latter is referred to as "end position information".

In a case where the terminal position information reception unit 122 receives the terminal position information (S101), the terminal position information reception unit 122 stores the terminal position information in the terminal position storage unit 152 by member ID included in the terminal position information (S102). Each portable terminal 50 transmits the terminal position information at regular intervals (for example, every minute or the like) or each time the portable terminal 50 moves a given distance or more. Accordingly, in the terminal position storage unit 152, a history of the terminal position information of each portable terminal 50 is stored.

Figure 5:
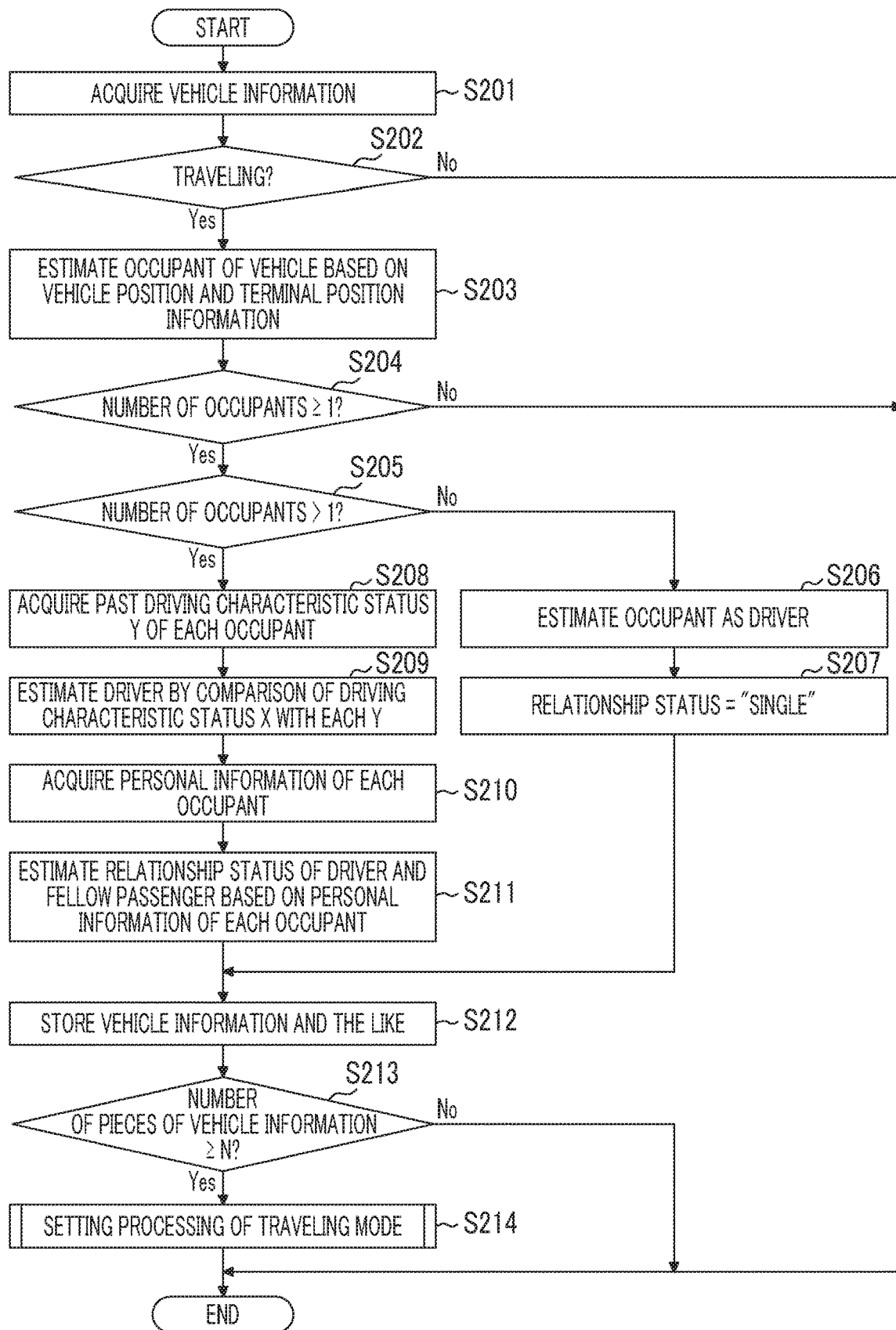
FIG. 5 is a flowchart illustrating an example of a processing procedure of estimation processing of a relationship between occupants of a vehicle.

FIG. 5 is a flowchart illustrating an example of a processing procedure of estimation processing of the relationship between occupants of the vehicle 30. In FIG. 5, the processing procedure is executed on each vehicle 30 where the start position information is received in FIG. 4. For example, the processing procedure is executed concerning the vehicle 30 (in-vehicle device 40) as a transmission source of the start position information when a given time has elapsed from reception of the start position information. The vehicle 30 that is focused in FIG. 5 is referred to as a "target vehicle 30", and the start position information transmitted from the target vehicle 30 is referred to as "target start position information".

In Step S201, the vehicle information acquisition unit 124 acquires the vehicle information from the target vehicle 30. Specifically, the vehicle information acquisition unit 124 transmits an acquisition request of the vehicle information to the in-vehicle device 40 (hereinafter, referred to as a "target in-vehicle device 40") of the target vehicle 30. The driving characteristic calculation unit 42 of the target in-vehicle device 40 calculates a driving characteristic status on a present trip according to the acquisition request.

Figure 6:
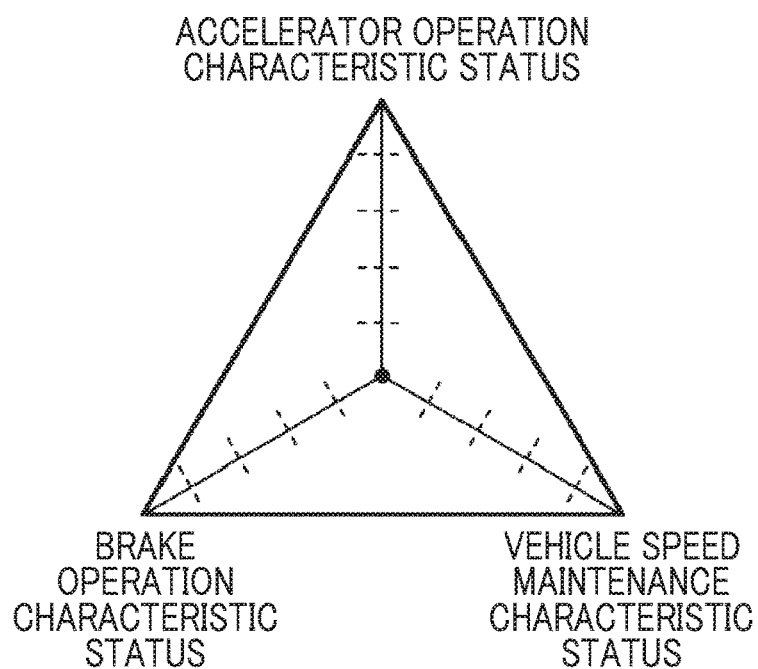
FIG. 6 is a diagram illustrating parameters constituting a driving characteristic status.

FIG. 6 is a diagram illustrating parameters constituting a driving characteristic status. In FIG. 6, the driving characteristic status is constituted of three parameters (characteristics) of an accelerator operation characteristic status, a vehicle speed maintenance characteristic status, and a brake operation characteristic status. Each status is evaluated in five ranks (five steps) of "Very Safety" to "Very Busy".

Figure 7:
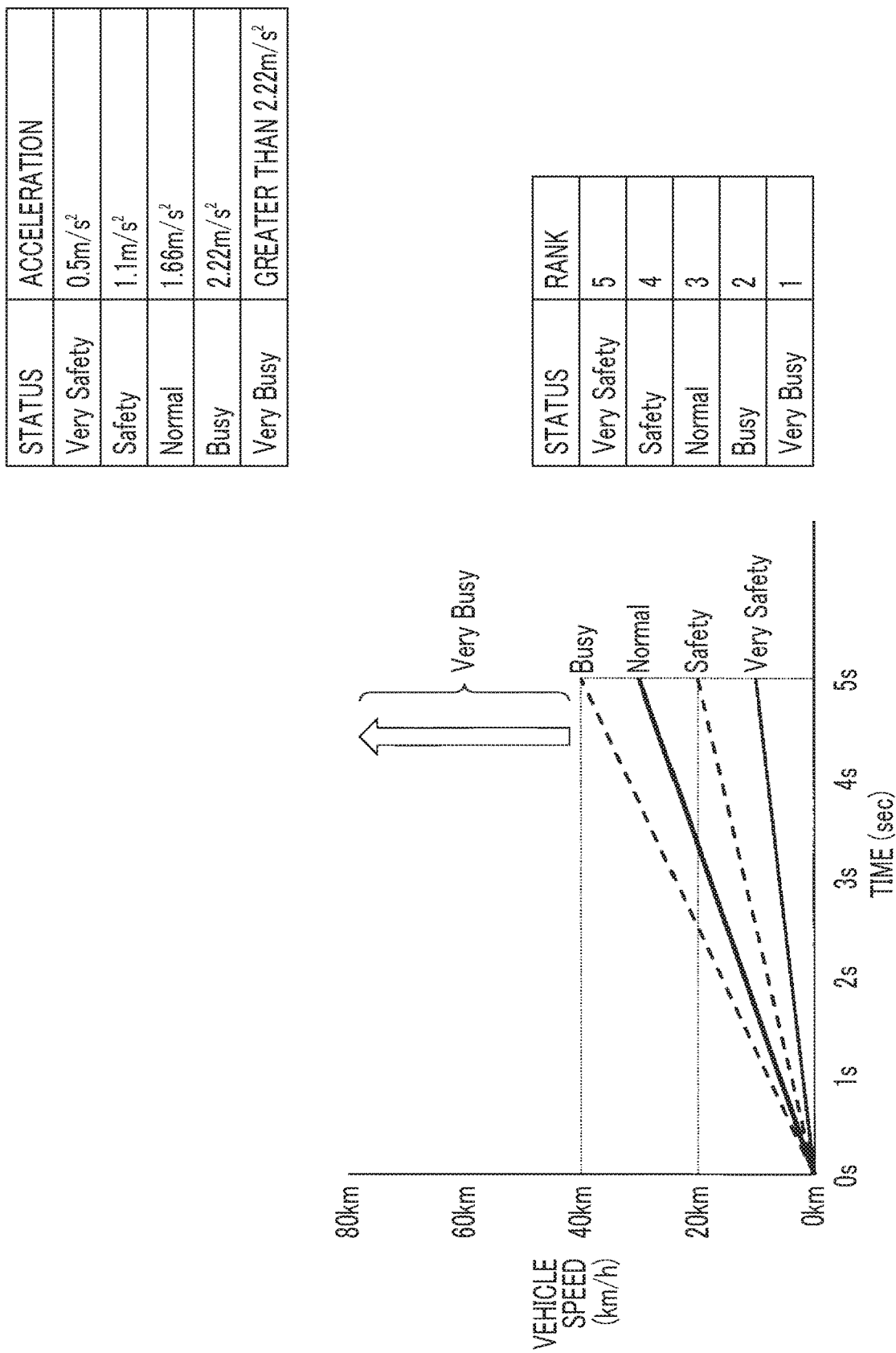
FIG. 7 is a graph and a table illustrating an accelerator operation characteristic status.

FIG. 7 is a diagram illustrating the accelerator operation characteristic status. The accelerator operation characteristic status is a parameter indicating a characteristic of an accelerator operation at the time of a vehicle start, and is classified into five ranks based on an acceleration for a predetermined time (for example, for five seconds) from the vehicle start, for example. The acceleration can be obtained by dividing a vehicle speed when a predetermined time has elapsed from the vehicle start by the predetermined time. In FIG. 7, as an example, when the acceleration is equal to or less than 0.5 m/s$^2$, the accelerator operation characteristic status is "Very Safety" (=rank 5), when the acceleration is equal to or less than 1.1 m/s$^2$, the accelerator operation characteristic status is "Safety" (=rank 4), when the acceleration is equal to or less than 1.66 m/s$^2$, the accelerator operation characteristic status is "Normal" (=rank 3), when the acceleration is equal to or less than 2.22 m/s$^2$, the accelerator operation characteristic status is "Busy" (=rank 2), and when the acceleration is greater than 2.22 m/s$^2$, the accelerator operation characteristic status is "Very Busy" (=rank 1).

Since a history of a vehicle speed is stored in the in-vehicle device 40, the driving characteristic calculation unit 42 can calculate the acceleration based on the history, and can obtain the accelerator operation characteristic status. In a present trip of the target vehicle 30, in a case where a plurality of vehicle starts occurs, the accelerator operation characteristic status may be obtained based on an average value of the acceleration at the time of the vehicle starts.

Figure 8:
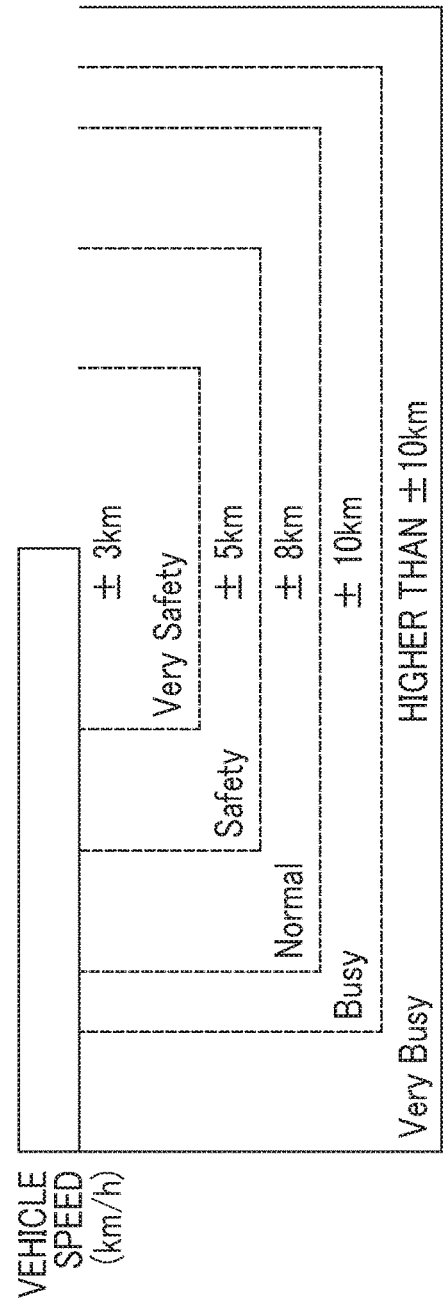
FIG. 8 is a diagram illustrating a vehicle speed maintenance characteristic status.

FIG. 8 is a diagram illustrating the vehicle speed maintenance characteristic status. The vehicle speed maintenance characteristic status is a parameter indicating a degree of variation in vehicle speed during traveling. During traveling, a predetermined period from a vehicle start and a predetermined period until a vehicle stop are not included. This is of course because the vehicle speed changes largely in the periods. That is, the term "during traveling" refers to a period (hereinafter, referred to as a "vehicle speed maintenance characteristic evaluation period") during which traveling at a substantially constant speed is expected.

In FIG. 8, when the vehicle speed in the vehicle speed maintenance characteristic evaluation period has variation within ±3 km, the vehicle speed maintenance characteristic status is "Very Safety" (=rank 5), when the vehicle speed in the vehicle speed maintenance characteristic evaluation period has variation within ±5 km, the vehicle speed maintenance characteristic status is "Safety" (=rank 4), when the vehicle speed in the vehicle speed maintenance characteristic evaluation period has variation within ±8 km, the vehicle speed maintenance characteristic status is "Normal" (=rank 3), when the vehicle speed in the vehicle speed maintenance characteristic evaluation period has variation within ±10 km, the vehicle speed maintenance characteristic status is "Busy" (=rank 2), and when the vehicle speed in the vehicle speed maintenance characteristic evaluation period has variation greater than ±10 km, the vehicle speed maintenance characteristic status is "Very Busy" (=rank 1).

As described above, since the history of the vehicle speed is stored in the in-vehicle device 40, the driving characteristic calculation unit 42 can calculate variation (the difference between a maximum value and a minimum value) in vehicle speed in the vehicle speed maintenance characteristic evaluation period based on the history, and can obtain the vehicle speed maintenance characteristic status. In the present trip of the target vehicle 30, in a case where there is a plurality of vehicle speed maintenance characteristic evaluation periods, the vehicle speed maintenance characteristic status may be obtained based on an average value of variation in vehicle speed in the vehicle speed maintenance characteristic evaluation periods.

Figure 9:
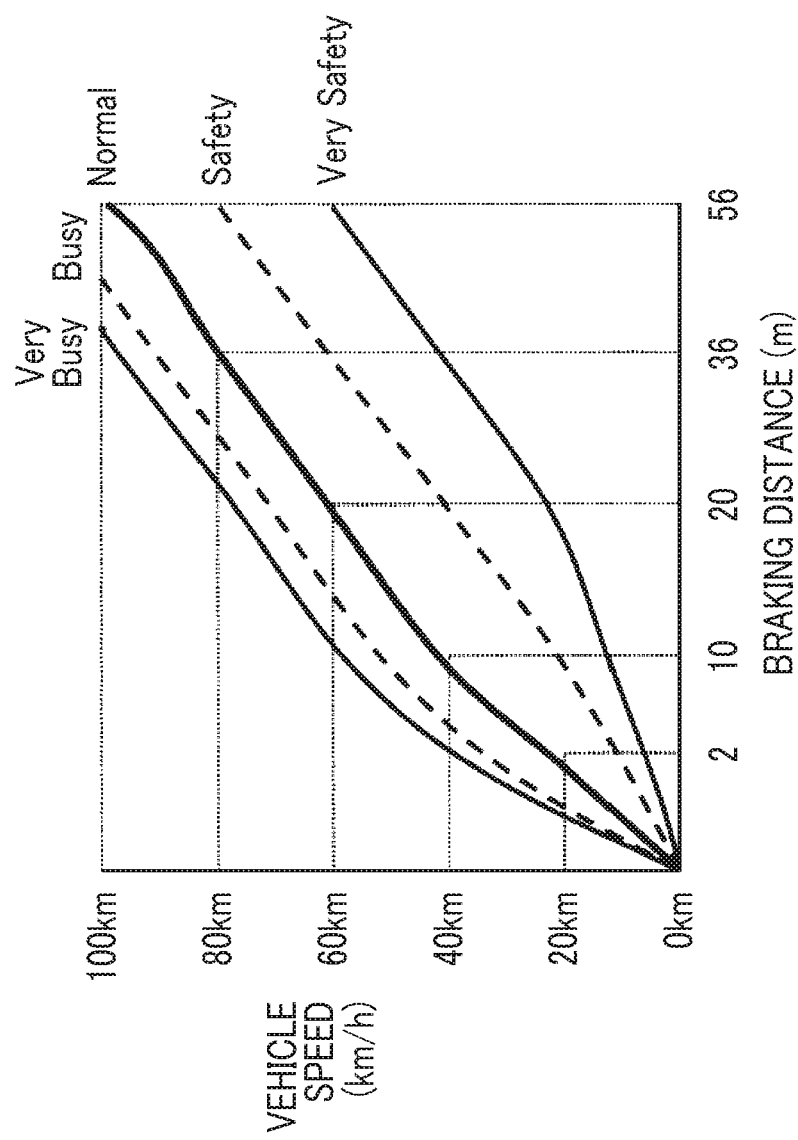
FIG. 9 is a graph and a table illustrating a brake operation characteristic.

FIG. 9 is a diagram illustrating a brake operation characteristic. The brake operation characteristic is a parameter indicating a characteristic of a brake operation, and is evaluated, for example, based on the vehicle speed at the time of a braking start and a braking distance. In the embodiment, the brake operation characteristic is classified in five ranks based on the relationship between a vehicle speed and a braking distance indicated by a graph shown in FIG. 9. Since a timing of a braking start (a timing at which a brake is depressed) and the history of the vehicle speed are recorded in the in-vehicle device 40, the driving characteristic calculation unit 42 can obtain the vehicle speed at the time of the braking start and the braking distance. The driving characteristic calculation unit 42 applies the vehicle speed and the braking distance to the graph shown in FIG. 9, thereby obtaining the brake operation characteristic. In the present trip of the target vehicle 30, in a case where a plurality of vehicle stops occurs, the brake operation characteristic may be obtained based on an average value of the vehicle speed at the time of the braking start and an average value of the braking distance at the time of each vehicle stop.

The vehicle information transmission unit 43 of the target in-vehicle device 40 transmits vehicle information including the driving characteristic statuses (accelerator operation characteristic status, vehicle speed maintenance characteristic status, and brake operation characteristic) obtained in the above-described manner and the parameter group detected by various sensors of the target vehicle 30 to the vehicle information acquisition unit 124 of the center 10. As a result, the vehicle information acquisition unit 124 can acquire the vehicle information (hereinafter, referred to as "target vehicle information") of the target vehicle 30.

FIG. 10 is a diagram showing a configuration example of the vehicle information. In FIG. 10, the vehicle information includes "vehicle position", "vehicle date and time", "ignition SW", "S&S ratio", "ENG restart factor history", "traveling mode", "accelerator operation characteristic status", "vehicle speed maintenance characteristic status", "brake operation characteristic status", and the like.

The "vehicle position" is information indicating a current position of the target in-vehicle device 40 (target vehicle 30) measured by the GPS. The "vehicle date and time" is information indicating current date and time measured by the GPS. The "ignition SW" is information indicating a state (ON or OFF) of an ignition switch of the target vehicle 30 at the present time. The "S&S ratio" refers to a stop and start ratio in the present trip, and is, for example, a value that is calculated by "(S&S vehicle stop time in present trip/(S&S vehicle stop time in present trip+idling time in present trip))×100". The "ENG restart factor history" is a history of a factor (hereinafter, simply referred to as a "restart factor") of a restart of an engine on each stop and start in the present trip. As the restart factor, for example, "battery factor", "brake factor", "air conditioner factor", "others", and the like are provided.

The traveling mode is a current traveling mode. The traveling mode is, for example, a traveling mode set from the center 10 based on previous trips.

The "accelerator operation characteristic status", the "vehicle speed maintenance characteristic status", and the "brake operation characteristic status" are parameters constituting the driving characteristic status evaluated concerning the present trip. The driving characteristic status included in the target vehicle information is hereinafter referred to as a "driving characteristic status X".

Subsequent to Step S201, the occupant estimation unit 123 determines whether or not the target vehicle 30 is traveling (S202). The determination can be performed, for example, whether or not the end position information of the target vehicle 30 is stored in the vehicle position storage unit 151. That is, a state in which the vehicle is traveling refers to a state in which the trip is being continued, and for example, a state of a vehicle stop due to waiting for a traffic signal, waiting for crossing, or the like is also included in the state in which the vehicle is traveling. In a case where the target vehicle 30 is not traveling (in S202, No), a subsequent processing procedure is not executed.

In a case where the target vehicle 30 is traveling (in S202, Yes), the occupant estimation unit 123 estimates the occupants of the target vehicle 30 based on the "vehicle position" included in the target vehicle information and the terminal position information stored in the terminal position storage unit 152 (S203). For example, the occupant estimation unit 123 extracts terminal position information indicating a position within a radius α (for example, 100) m from a position indicated by "vehicle position", terminal position information including the date and time with the difference from "vehicle date and time" of the target vehicle information within β seconds from the terminal position storage unit 152. When the number of pieces of corresponding terminal position information is within a predetermined value (for example, within four), the occupant estimation unit 123 estimates a member related to a member ID given to each piece of extracted terminal position information as an occupant of the target vehicle 30. For example, a member related to the portable terminal 50 being moving in the substantially same trajectory as the target vehicle 30 for the last several minutes may be estimated as an occupant of the target vehicle 30. In this case, the in-vehicle device 40 may transmit the vehicle position information to the center at regular intervals.

In a case where any occupant of the target vehicle 30 is not estimated by the occupant estimation unit 123 (in S204, No), the processing procedure of FIG. 5 ends.

In a case where one or more occupants are estimated by the occupant estimation unit 123 (in S204, Yes), the driver estimation unit 125 determines whether or not the number of occupants estimated in Step S203 is plural (S205). That is, the presence or absence of a fellow passenger is automatically determined. In a case where the number of occupants is not plural (that is, in a case where the number of occupants is one) (in S205, No), the driver estimation unit 125 estimates the one occupant as a driver and stores the driving characteristic status X in the member information storage unit 153 in association with a member ID related to the occupant (S206). The driver estimation unit 125 associates the member ID of the occupant estimated as the driver as the member ID (hereinafter, referred to as a "driver ID") of the driver with the target vehicle information.

The relationship estimation unit 126 estimates a relationship status between a driver and a fellow passenger as "single" (S207). The relationship estimation unit 126 associates "single" as the value of the relationship status with the target vehicle information. The relationship status refers to an index indicating the relationship between the driver and the fellow passenger. In the embodiment, "relationship status" is classified into "single", "family", "friend", "partner", "business", and the like. The "single" indicates that a fellow passenger is not present. The "family" indicates that the driver and the fellow passenger are a family. The "friend" indicates that the fellow passenger is a friend of the driver. The "partner" indicates that the fellow passenger is a dating partner of the driver. The "business" indicates that the fellow passenger is a co-worker (a colleague, a superior, or a subordinate of a workplace) of the driver. Other relationship statuses may be defined.

In a case where the number of occupants of the target vehicle 30 is plural (in S205, Yes), the driver estimation unit 125 acquires the driving characteristic status associated with the member ID of each occupant from the member information storage unit 153 (S208). For each member, the member information storage unit 153 may store the driving characteristic status (that is, the latest value of the driving characteristic status) estimated at last in a case where the member is the driver or may store a history of the driving characteristic status. In the former case, one driving characteristic status is acquired for each occupant. In the latter case, one or more driving characteristic statuses are acquired for each occupant. In both cases, the driving characteristic status acquired from the member information storage unit 153 on each occupant is hereinafter referred to as a "driving characteristic status Y". In regard to an occupant who has not been estimated as a driver in the past, the driving characteristic status is not stored in the member information storage unit 153. Accordingly, the driving characteristic status Y of the occupant is not acquired.

The driver estimation unit 125 estimates one of the occupants of the target vehicle 30 as a current driver of the target vehicle 30 by comparing the driving characteristic status X with each driving characteristic status Y, and stores the driving characteristic status X in the member information storage unit 153 in association with the member ID of the occupant estimated as the driver (S209). That is, a driver is estimated based on commonality of a characteristic (habit) of driving. The driver estimation unit 125 sets the member ID of the occupant estimated as a driver as a driver ID, sets the member ID of the occupant not estimated as a driver as an ID (hereinafter, referred to as a "fellow passenger ID") of the fellow passenger, and associates the driver ID and the fellow passenger ID with the target vehicle information.

A comparison method of the driving characteristic status X and the driving characteristic status Y is not limited to a specific method. For example, in regards to all of the three statuses constituting the driving characteristic status, the difference between the driving characteristic status X and each driving characteristic status Y may be obtained, and an occupant corresponding to the driving characteristic status Y having the smallest difference may be estimated as a driver. Alternatively, the driving characteristic status may be treated as a vector with the three statuses as dimensions, a distance of a vector between the driving characteristic status X and each driving characteristic status Y may be obtained, and an occupant corresponding to the driving characteristic status Y having the minimum distance may be estimated as a driver. In regard to an occupant that a plurality of histories of driving characteristic status Y is acquired, an average value of the histories may be used.

It is considered that each driver (each individual) has a habit in driving. Accordingly, the driver is estimated based on the driving characteristic status, whereby it is possible to increase estimation accuracy about which of the occupants is a driver.

The relationship estimation unit 126 acquires the personal information of each of the occupants (driver and fellow passenger) of the target vehicle 30 (S210).

FIG. 11 is a diagram showing a configuration example of the personal information. In FIG. 11, an example where the personal information including "member ID", "sex", "age", "date of birth", "address", "family composition", "occupation", "work location", "entrance year", "telephone number", "mail address", and the like is shown.

All items constituting the personal information may be stored in the member information storage unit 153 in advance. Alternatively, at the point of time of Step S210, the relationship estimation unit 126 may acquire some items from the portable terminal 50 of each occupant or may acquire some items from the external server 60. In a case where some items are acquired from the external server 60, the correspondence information of the member ID in the external server 60 and the member ID in the center 10 may be stored in the auxiliary storage device 102 or the like in advance.

The relationship estimation unit 126 collates the personal information of the driver with the personal information of the fellow passenger to estimate the relationship status between the driver and the fellow passenger, and associates the estimated relationship status with the target vehicle information (S211).

For example, the "family" can be estimated based on commonality of the "address" of the personal information of the driver and the fellow passenger. That is, in a case where the "address" of the driver coincides with the "address" of the fellow passenger, the relationship estimation unit 126 estimates "family" as the relationship status.

Since the "friend" is hardly estimated solely with the personal information shown in FIG. 11, for example, improvement of estimation accuracy about the relationship of the "friend" may be achieved using address books stored in the portable terminals 50 of the driver and each fellow passenger, the external server 60, or the like.

Specifically, the relationship estimation unit 126 acquires the address books from the portable terminals 50 of the driver and each fellow passenger, and confirms registration situations of mutual contacts. In a case where the contact of the fellow passenger is registered in the address book of the portable terminal 50 of the driver and the contact of the driver is registered in the address book of the portable terminal 50 of the fellow passenger, the relationship estimation unit 126 estimates that the driver and the fellow passenger have the relationship of the "friend".

In a case where the relationship of the "friend" is estimated based on the address book, the relationship estimation unit 126 acquires a "friend list" from the external server 60 that provides the SNS, the relationship of the "friend" is subdivided into a simple acquaintance ("friend (acquaintance)"), a good friend ("friend (good friend)"), and a best friend ("friend (best friend)") based on a following situation.

For example, when at least one of the driver and the fellow passenger follows the other, and the follow years are less than one year, the relationship of the "friend" may be classified into "friend (acquaintance)", when the follow years are equal to or longer than one year and less than three years, the relationship of the "friend" may be classified into "friend (good friend)", and when the follow years are equal to or greater than three years, the relationship of the "friend" may be classified into "friend (best friend)".

In a case where the driver and the fellow passenger are different in sex, estimation relating to the "partner" described below is performed, and in a case where the relationship is not the "partner", estimation relating to the "friend" may be performed.

Since the "partner" is hardly estimated solely with the personal information shown in FIG. 11, for example, the relationship of the "partner" may be estimated using the address books stored in the portable terminals 50 of the driver and each fellow passenger, the external server 60, or the like.

Specifically, as in a case of the "friend", the relationship estimation unit 126 confirms registration situations of the address books of the portable terminals 50 of the driver and the fellow passenger. When mutual contacts are registered in the address books, the relationship estimation unit 126 acquires dating situations from the external server 60 that provides the SNS, and compares the dating situations.

Figures 12, 13, 14:
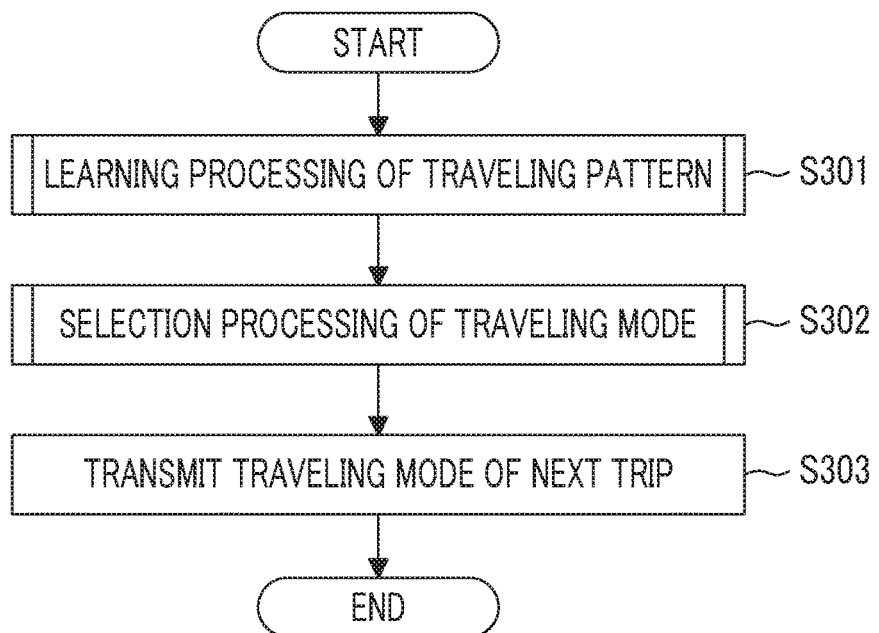
FIG. 12 is a diagram showing an example of a dating situation that can be acquired from a social networking service (SNS)
FIG. 13 is a diagram showing a configuration example of a vehicle information storage unit.
FIG. 14 is a flowchart illustrating an example of a processing procedure of setting processing of a traveling mode of a next trip.

FIG. 12 is a diagram showing an example of a "dating situation" that can be acquired from the SNS. In FIG. 12, an example where "dating status" and "keeping dating" can be acquired as items constituting the dating situation is shown. In FIG. 12, one record indicates a record corresponding to the driver, and the other record indicates a record corresponding to the fellow passenger.

For example, when the "dating status" of each of the driver and the fellow passenger is "keeping dating" and "date of start dating" is coincident, the relationship estimation unit 126 estimates that the driver and the fellow passenger are the "partner". In a case where the relationship is not the "partner", estimation about the "friend" is performed.

In a case where the relationship of the "partner" is estimated, the relationship estimation unit 126 may subdivided the relationship of the "partner" into "partner (beginning)", "partner (medium term)", and "partner (long term)" according to an elapsed period (that is, a dating period) from the "date of start dating" to the current date. For example, when the dating period is less than one year, the relationship of the "partner" may be classified into the "partner (beginning)", when the dating period is less than three years, the relationship of the "partner" may be classified into the "partner (medium term)", and when the dating period is equal to or longer than three years, the relationship of the "partner" may be classified into the "partner (long term)".

The "business" can be estimated based on commonality of "work location" of the personal information of the driver and the fellow passenger. That is, in a case where the "work location" of the driver coincides with the "work location" of the fellow passenger, the relationship estimation unit 126 estimates the "business" as the relationship status. In a case where the relationship of the "business" is estimated, the relationship estimation unit 126 subdivides the relationship of the "business" into "business (colleague)", "business (subordinate×superior)", and "business (superior×subordinate)" based on the "entrance year" of the personal information of the driver and the fellow passenger.

For example, when the "entrance year of the driver coincides with the "entrance year" of the fellow passenger, the relationship of the 'business" is classified into the "business (colleague)", and the "entrance year" of the fellow passenger is before the "entrance year" of the driver, the relationship of the "business" may be classified into the "business (subordinate×superior)", and when the "entrance year" of the fellow passenger is after the "entrance year" of the driver, the relationship of the "business" may be classified into the "business (superior×subordinate)".

Subsequent to Step S207 or S211, the learning unit 127 stores (additionally registers) one record including information associated with the target vehicle information, the target start position information, and the target vehicle information in the vehicle information storage unit 154 (S212).

FIG. 13 is a diagram showing a configuration example of the vehicle information storage unit 154. As shown in FIG. 13, in the vehicle information storage unit 154, a record including "vehicle information", "start position information", "driver ID", "fellow passenger ID", and "relationship status" is stored for each trip. The "vehicle information" has the configuration shown in FIG. 10. In the "start position information", the target start position information is stored. A value of the item of the fellow passenger ID in a record corresponding to a trip where a fellow passenger is not present is empty.

The learning unit 127 determines whether or not N or more records are stored in the vehicle information storage unit 154 on the target vehicle 30 (S213). N is a value indicating the number of records sufficient for learning the traveling pattern of the target vehicle 30. In a case where the number of records of the target vehicle 30 is equal to or greater than N (in S213, Yes), the center 10 executes setting processing of a traveling mode of the next trip concerning the target vehicle 30 (S214). In a case where the number of records of the target vehicle 30 is less than N, Step S214 is not executed. Step S213 and subsequent steps may be executed asynchronously with the steps before Step S213. For example, Step S213 and subsequent steps may be executed in a batch on each vehicle 30.

Details of Step S214 of FIG. 5 will be described. FIG. 14 is a flowchart illustrating an example of a processing procedure of the setting processing of the traveling mode of the next trip.

In Step S301, the learning unit 127 executes learning processing of the traveling pattern of the target vehicle 30 based on a record group stored in the vehicle information storage unit 154 concerning the target vehicle 30. Although details of the learning processing will be described below, as a result of the learning processing, the following learning result is stored in the learning result storage unit 155.

FIG. 15 is a diagram showing a configuration example of the learning result storage unit 155. A table shown in FIG.

15 indicates a learning result relating to one vehicle 30 (target vehicle 30). As shown in FIG. 15, the learning result storage unit 155 stores records by "day of week (weekday or holiday)" and by "time slot". Each record has items of "start position information", "end position information", "ENG restart factor frequency", "estimated destination", "S&S ratio", "driver ID", "fellow passenger ID", "relationship status", "traveling mode (current trip)", "traveling mode (next trip)", and the like.

The "start position information" is a latitude and a longitude of a start position of a representative (highly frequent) trip in the time slot. The "end position information" is a latitude and a longitude of an end position of the trip. The "ENG restart factor frequency" is a representative value of frequencies of various ENG restart factors in the time slot. The "S&S ratio" is a representative value of an S&S ratio in the time slot. The "driver ID" is a driver ID (member ID) of a driver of a representative trip in the time slot. The fellow passenger ID is a fellow passenger ID (member ID) of a fellow passenger of the trip. The "relationship status" is a relationship status between a member related to the "driver ID" and a member related to the "fellow passenger ID". The "traveling mode (current trip)" is a traveling mode that is set to the target vehicle 30 concerning the time slot at the present time. The "traveling mode (next trip)" is a traveling mode that is to be set to the target vehicle 30 concerning the next trip.

The traveling mode selection unit 128 executes selection processing of a traveling mode based on the learning result stored in the learning result storage unit 155 (S302). In the selection processing of the traveling mode, a traveling mode appropriate for the traveling pattern of the target vehicle 30 is selected by "day of week (weekday or holiday)" and by "time slot", and the selected traveling mode is stored in the "traveling mode (next trip)" of the learning result storage unit 155. Details of the selection processing of the traveling mode will be described below.

The traveling mode transmission unit 129 transmits a value stored in the "traveling mode (next trip)" of the learning result storage unit 155, that is, a selection result (hereinafter, referred to as a "traveling mode schedule") of the traveling mode by weekday and holiday and by time slot to the in-vehicle device 40 of the target vehicle 30 (S303).

When the traveling mode schedule transmitted in Step S303 is received, the traveling mode reception unit 44 of the in-vehicle device 40 requests the traveling controller 31 for control according to the traveling mode schedule. When the next trip is started, the traveling controller 31 performs control according to a traveling mode (hereinafter, referred to as a "target traveling mode") that is set on a time slot corresponding to the start (for example, when next ignition is ON). That is, in the time slot, control according to a traveling mode selected based on a use result in the time slot in the past is performed on an assumption that the target vehicle 30 is used in the same usage (the destination or the fellow passenger is the same) as that in the time slot in the past.

For example, when the target traveling mode is the "fuel efficiency priority mode", the traveling controller 31 increases an operation frequency of "stop and start" such that the "S&S ratio" reaches to be equal to or greater than a given value (for example, equal to or greater than 70%). Specifically, the traveling controller 31 performs control such that a stop and start time is extended at the expense of comfort by turning off a compressor of an air conditioner, setting an A/C air amount Hi/Mid to Lo, or the like.

When the target traveling mode is the "comfort priority mode", the traveling controller 31 gives priority to securing comfort at the expense of the "S&S ratio". Specifically, the traveling controller 31 gives priority to an operation of a user of the target vehicle 30, and gives priority to an operation of the user of the target vehicle 30 on turning on of the compressor of the air conditioner, setting of the A/C air amount, or the like. Even though transition is made to a stop and start state, the traveling controller 31 restarts the engine within a short time.

When the target traveling mode is the "50-50 mode", the traveling controller 31 gives priority to both of fuel efficiency and comfort. Specifically, the traveling controller 31 performs control such that the "S&S ratio" is limited to a given value (for example, 50%), and in a case where the "S&S ratio" exceeds the given value or in a case where the "stop and start time" exceeds a predetermined time, control is performed such that an operation frequency of the air conditioner is increased to secure comfort.

When the target traveling mode is the "charging mode", the traveling controller 31 performs control such that the stop and start operation is prohibited and battery charging is kept. For example, in a case where there are many opportunities of "S&S", but an operation frequency of a starter is high with the occurrence of congestion and the degree of contribution of fuel efficiency is low, the traveling controller 31 performs control such that a frequency of regenerative charging becomes high.

Details of Step S301 of FIG. 14 will be described. FIG. 16 is a flowchart illustrating an example of a processing procedure of the learning processing of the traveling pattern.

In Step S401, the learning unit 127 acquires a record group (hereinafter, referred to as a "target record group") relating to the target vehicle 30 from the vehicle information storage unit 154 (FIG. 13) in a time-series order. For each record included in the target record group, the learning unit 127 acquires an end position information corresponding to the record from the vehicle position storage unit 151, and provides the acquired end position information to the record (S402). The end position information corresponding to the record refers to end position information including date and time between the date and time included in the "start position information" of the record and the date and time included in the "start position information" of a record next to the record. In a case where the processing procedure of FIG. 16 is executed synchronously subsequent to Step S212 of FIG. 5 (that is, in a case where the processing procedure of FIG. 16 is executed while the target vehicle 30 as a transmission source of the vehicle information is traveling), since the end position information corresponding to the last record in the target record group is not stored in the vehicle position storage unit 151, the end position information may not be provided to the record.

The learning unit 127 integrates two or more records highly likely to relate to the same trip in the target record group into one record (S403). As a result, the number of records included in the target record group is likely to decrease. That is, on a certain trip, in a case where a stopover occurs in a convenience store, a service area, or the like on the way to the destination, a record relating to the trip is divided into two records due to parking for the stopover and the two records are stored in the vehicle information storage unit 154. The records described above are integrated. For example, in a case where the "driver ID", the "fellow passenger ID", and the "relationship status" of a certain record and the next record are the same, and the difference (that is, a parking duration) between the date and time included in the end position information provided to the certain record and the date and time included in the "start position information" of the next record is equal to or less than a threshold (for example, 30 minutes or the like), the certain record and the next record may be integrated into one record. The threshold may be calculated, for example, based on the distribution of the difference between the date and time of the "end position information" and the date and time of the "start position information" of preceding and subsequent records. Such processing may be performed recursively, whereby three or more records may be integrated. In the "start position information" of the record after integration, the "start position information" of the first record in a time-series order of the records before integration is employed.

The learning unit 127 classifies the records included in the target record group into groups by weekday or holiday or by time slot (S404).

The learning unit 127 specifies representative values of the start position information and the end position information of a trip for each group (S405). For example, the start position information and the end position information of a set having the highest appearance frequency among the sets of the start position information and the end position information of the records in a certain group may be set as the representative values of the start position information and the end position information of the group. The learning unit 127 stores the representative value of the start position information specified on each group in the "start position information" of a record corresponding to a time slot related to each group in the learning result storage unit 155 (FIG. 15), and stores the representative value of the end position information specified on each group in the "end position information" of a record corresponding to a time slot related to each group in the learning result storage unit 155 (FIG. 15).

As the end position information of each record, the end position information provided to each record in Step S402 may be used or the "start position information" of the next record may be used. This is because an end position of a certain trip is a start position of the next trip.

The learning unit 127 calculates a representative value of the frequency of each ENG restart factor ("battery factor", "brake factor", "air conditioner factor") for each group (S406). For example, the representative value of the frequency of the battery factor of a certain group may be obtained by calculating an average of the frequencies of the "battery factor" included in the "ENG restart factor history" of the "vehicle information" of the records belonging to the group. In this case, a target record may be limited to a record corresponding to the representative values of the "start position information" and the "end position information" relating to the group. The representative values of the frequency of the "brake factor" and the frequency of the "air conditioner factor" can be calculated in the same manner. The learning unit 127 stores the representative value of the frequency of each of the "battery factor", the "brake factor", and the "air conditioner factor" calculated on each group in the "ENG restart factor frequency" of a record corresponding to a time slot related to each group in the learning result storage unit 155 (FIG. 15).

The learning unit 127 calculates a representative value of the S&S ratio for each group (S407). For example, the representative value of the S&S ratio of a certain group may be obtained by calculating an average of the "S&S ratio" of the "vehicle information" of the records belonging to the group. In this case, a target record may be limited to a record corresponding to the "start position information" and the "end position information" relating to the group. The learning unit 127 stores the representative value of the S&S ratio calculated on each group in the "S&S ratio" of a record corresponding to a time slot related to each group in the learning result storage unit 155 (FIG. 15).

The learning unit 127 specifies representative values of the driver ID, the fellow passenger ID, and the relationship status for each group (S408). For example, the "driver ID", the "fellow passenger ID", and the "relationship status" of a set having the highest appearance frequency among the sets of the "driver ID", the "fellow passenger ID", and the "relationship status" of the records belonging to a certain group may be set as the above-described representative values on the group. In this case, a target record may be limited to a record corresponding to the representative values of the "start position information" and the "end position information" relating to the group. The learning unit 127 stores the driver ID, the fellow passenger ID, and the relationship status specified on each group in the "driver ID", the "fellow passenger ID", and the "relationship status" of a record corresponding to a time slot related to each group in the learning result storage unit 155 (FIG. 15), respectively.

For each group, the learning unit 127 specifies an estimated destination of a trip corresponding to the group (S409). The estimated destination of a certain group can be specified based on the "end position information" specified on a time slot related to the group. For example, a point of interest (POI) corresponding to the "end position information" can be searched from map data, and the estimated destination can be specified to be "shopping center" or "lunch". With collation of the search result with the personal information (FIG. 11), "home", "workplace", or the like can be specified as the estimated destination. On a time slot when the estimated destination is not specified even in the above-described manner, an estimated destination of a time slot on a weekday where the "relationship status" is "business" or "single" may be "business trip destination". The estimated destination may be specified by other methods. The learning unit 127 stores the estimated destination specified on each group in the "estimated destination" of a record corresponding to a time slot related to each group in the learning result storage unit 155 (FIG. 15).

As a result of the above-described processing, the learning result shown in FIG. 15 is generated.

Figure 17:
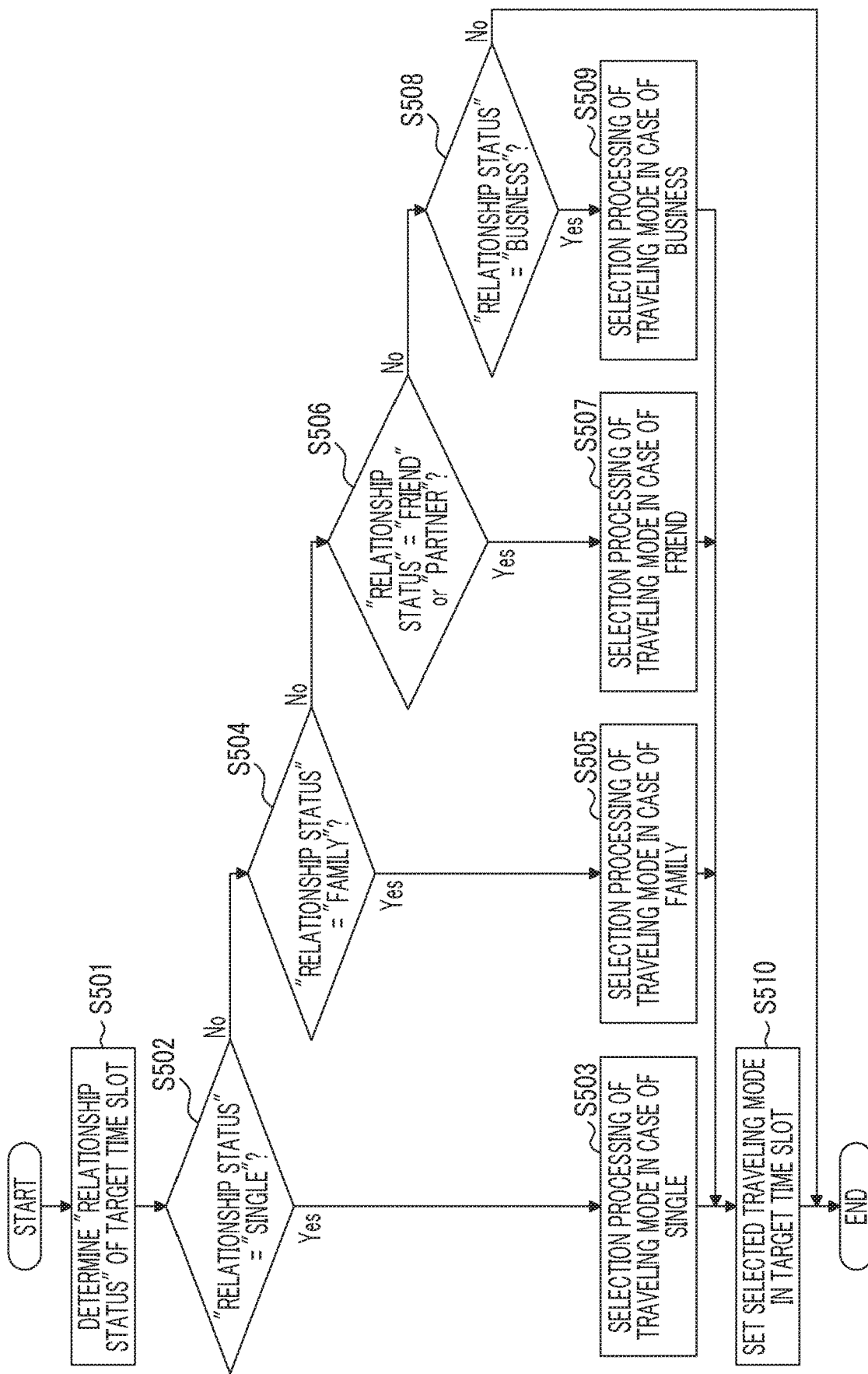
FIG. 17 is a flowchart illustrating an example of a processing procedure of selection processing of a traveling mode according to the first embodiment.

Details of Step S302 of FIG. 14 will be described. FIG. 17 is a flowchart illustrating an example of a processing procedure of the selection processing of the traveling mode according to the first embodiment. In Step S302 of FIG. 14, the processing procedure shown in FIG. 17 is executed on each "time slot" of each "day of week" of the learning result storage unit 155 (FIG. 15). Here, the "day of week" and the "time slot" to be processed are referred to as a "target time slot".

In Step S501, the traveling mode selection unit 128 determines whether or not the "relationship status" of the target time slot is the "single" in the learning result storage unit 155 corresponding to the target vehicle 30. In a case where the "relationship status" is the "single" (in S502, Yes), the traveling mode selection unit 128 executes selection processing of a traveling mode in a case of the single (S503). In the selection processing of the traveling mode in a case of the single, the traveling mode is selected primarily based on the "estimated destination".

For example, in a case where the target time slot is a time slot of commuting on the weekday morning and the "estimated destination" is the "workplace" (that is, in a case of an outward way from the home to the workplace), when the "S&S ratio" of the target time slot is low and the frequency of the "brake factor" is large, a possibility of the occurrence of congestion is estimated. The traveling mode selection unit 128 selects the "charging mode" as the traveling mode of the target time slot.

In a case where the target time slot is a time slot of returning home on the weekday evening and the "estimated destination" is the "home" (that is, a return way from the workplace to the home), when the "S&S ratio" is about 50%, the frequency of the "brake factor" is small, and the frequency of the "air conditioner factor" is small, the traveling mode selection unit 128 may select the "fuel efficiency priority mode" as the traveling mode of the target time slot in expectation of an increase in "S&S ratio".

In a case where the target time slot is a time slot other than a time slot of commuting or returning home on the weekday, the traveling mode selection unit 128 may select the traveling mode of the target time slot as follows. For example, in a case where the "estimated destination" is the "business trip destination" (that is, an outward way from the workplace to the business trip destination) or the "workplace" (that is, a return way from the business trip destination to the workplace), the "S&S ratio" is low, and the frequency of the "air conditioner factor" is large, the traveling mode selection unit 128 may select the "fuel efficiency priority mode" as the traveling mode of the target time slot for cost reduction and may increase the "S&S ratio". Alternatively, in a case of the return way to the workplace (also including a return way from the lunch), the traveling mode selection unit 128 may select the "charging mode" as the traveling mode of the target time slot. In a case where the "estimated destination" is a short trip such as "lunch", the traveling mode selection unit 128 may select the "charging mode" as the traveling mode of the target time slot and may increase the "S&S ratio".

In a case where the target time slot is a time slot on any "holiday", the traveling mode selection unit 128 may select the traveling mode of the target time slot as follows. For example, in a case where the "estimated destination" is the "shopping center" (that is, in a case of an outward way from the home to the shopping center), when the "S&S ratio" is low and the frequency of the "brake factor" is large, the occurrence of congestion is estimated. The traveling mode selection unit 128 may select the "charging mode" as the traveling mode of the target time slot, may restrain the operation of S&S in the target vehicle 30, and may keep charging of the battery. In a case where the "estimated destination" is the "home" (that is, in a case of a return way from the shopping center to the home), when the "S&S ratio" is about 50%, the frequency of the "brake factor" is small, and the frequency of the "air conditioner factor" is also small, the traveling mode selection unit 128 may select the "fuel efficiency priority mode" as the traveling mode of the target time slot and may increase the "S&S ratio".

In a case where the "relationship status" is not the "single" (in S502, No)" but is the "family" (in S504, Yes), the traveling mode selection unit 128 executes selection processing of a traveling mode in a case of the family (S505). In the selection processing of the traveling mode in a case of the family, the traveling mode is selected primarily based on a possibility that an infant or an aged person is included in the fellow passenger. The possibility that an infant or an aged person is included may be specified with reference to the "family composition" of the personal information (FIG. 11) of the driver of the target vehicle 30. In a case where "child" is included in the "family composition" and the "age" of the driver is equal to or less than a given age, determination may be made that an infant is highly likely to be included in the fellow passenger. Similarly, in a case where "father or mother" is included in the "family composition" and the "age" of the driver is equal to or higher than a given age, determination may be made that an aged person is highly likely to be included in the fellow passenger. In a case where an infant is less likely to be included in the fellow passenger, in order to save a household budget and secure comfort, the traveling mode selection unit 128 may select the "50-50 mode" as the traveling mode of the target time slot. In a case where an infant or an aged person is highly likely to be included in the fellow passenger, an infant or an aged person who is sensitive to shaking, vibration, or the like may be given priority, and the traveling mode selection unit 128 may select the "comfort priority mode" as the traveling mode of the target time slot.

In a case where the "relationship status" is not the "family" (in S504, No)" but is the "friend" or the "partner" (in S506, Yes), the traveling mode selection unit 128 executes selection processing of a traveling mode in a case of the friend (S507). In the selection processing of the traveling mode in a case of the friend, the traveling mode is selected primarily according to the degree of intimacy between the driver and the fellow passenger.

For example, in a case where the "relationship status" is the "friend (acquaintance)", since a relationship period is short, the traveling mode selection unit 128 may give priority to comfort and may select the "comfort priority mode" as the traveling mode of the target time slot.

In a case where the "relationship status" is the "friend (good friend)", since the relationship period is a little long, the traveling mode selection unit 128 may give priority to both of fuel efficiency and comfort and may select the "50-50 mode" as the traveling mode of the target time slot.

In a case where the "relationship status" is the "friend (best friend)", since the "relationship period" is long and the driver and the fellow passenger are highly likely to understand each other, the traveling mode selection unit 128 may select the "fuel efficiency priority mode".

In a case where the "relationship status" is the "partner", the traveling mode may be selected in the same way of thinking as the above. That is, the "partner (beginning)" may be processed in the same manner as the "friend (acquaintance)", the "partner (medium term)" may be processed in the same manner as the "friend (good friend)", and the "partner (long term)" may be processed in the same manner as the "friend (best friend)".

In a case where the "relationship status" is neither the "friend" nor the "partner" (in S506, No) but is the "business" (in S508, Yes), the traveling mode selection unit 128 executes selection processing of a traveling mode in a case of the business (S509). In the selection processing of the traveling mode in a case of the business, the traveling mode is selected primarily according to a pecking order of the driver and the fellow passenger.

For example, in a case where the "relationship status" is the "business (colleague)", the traveling mode selection unit 128 may select the "fuel efficiency priority mode" as the traveling mode of the target time slot, thereby giving priority to cost reduction.

In a case where the "relationship status" is the "business (subordinate×superior)", the traveling mode selection unit 128 may select the "comfort priority mode" as the traveling mode of the target time slot, thereby giving priority to comfort of the fellow passenger (superior).

In a case where the "relationship status" is the "business (superior×subordinate)", the traveling mode selection unit 128 may select the "fuel efficiency priority mode" as the traveling mode of the target time slot.

Subsequent to Step S503, S505, S507, or S509, the traveling mode selection unit 128 stores the selected traveling mode in the "traveling mode (next trip)" of a record corresponding to the target time slot in the learning result storage unit 155 (FIG. 15).

The selection method of the traveling mode in the above description is an example, and the traveling mode may be selected by other methods.

The processing procedure of FIG. 17 is executed on each time slot, whereby the "traveling mode (next trip)" corresponding to each time slot where the "relationship status" is stored in the learning result storage unit 155 (FIG. 15) is stored in the learning result storage unit 155. In Step S303 of FIG. 14, the columns of the "day of week", the "time slot", and the "traveling mode (next trip)" of the learning result storage unit 155 corresponding to the target vehicle 30 are transmitted as a traveling mode schedule to the target in-vehicle device 40.

In the learning result storage unit 155 (FIG. 15), the value of the column of the "traveling mode (next trip)" may be copied to the column of the "traveling mode (current trip)", for example, when the next start position information is received from the target in-vehicle device 40 (that is, when the next trip of the target vehicle 30 is started).

As described above, according to the first embodiment, the traveling mode is selected based on the relationship between the driver and the fellow passenger. Accordingly, it is possible to enable the traveling control of the vehicle 30 based on the relationship between the driver and the fellow passenger. As a result, it is possible to perform driving assistance appropriate for the user of the vehicle 30.

Next, a second embodiment will be described. In the second embodiment, points that are different from the first embodiment will be described. Accordingly, points that are not particularly mentioned may the same as those in the first embodiment.

Figure 18:
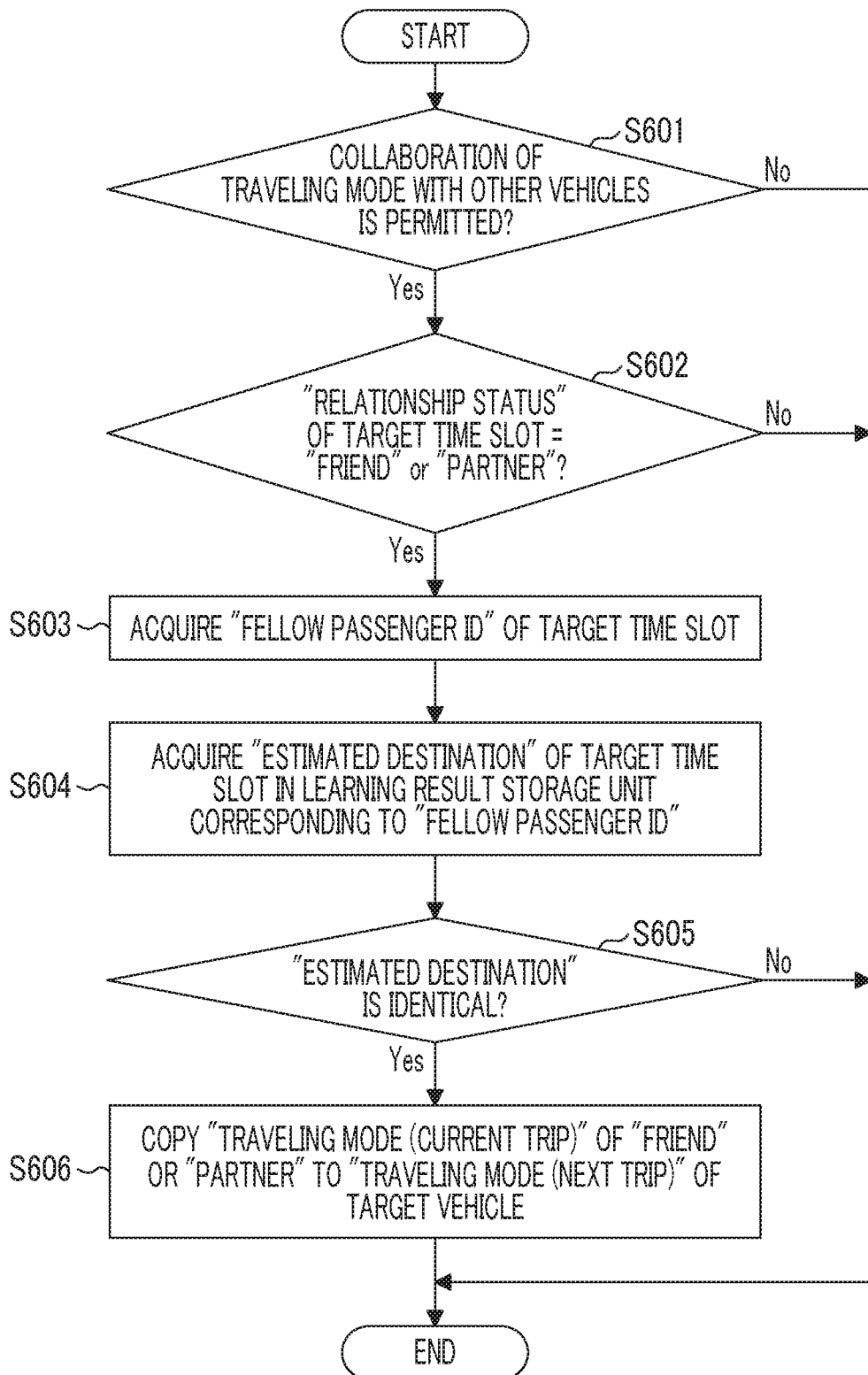
FIG. 18 is a flowchart illustrating an example of a processing procedure of selection processing of a traveling mode according to a second embodiment.

In the second embodiment, in Step S302 of FIG. 14, a processing procedure shown in FIG. 18 is executed. That is, the processing procedure of FIG. 18 is executed instead of the processing procedure of FIG. 17.

FIG. 18 is a flowchart illustrating an example of a processing procedure of selection processing of a traveling mode according to the second embodiment. In Step S302 of FIG. 14, the processing procedure shown in FIG. 18 is executed on each "day of week" and each "time slot" of the learning result storage unit 155 (FIG. 15). Here, the "day of week" and the "time slot" to be processed are referred to as a "target time slot".

In Step S601, the traveling mode selection unit 128 determines whether or not collaboration of a traveling mode with other vehicles is permitted with respect to the target vehicle 30. For example, the permission of the collaboration may be received from the portable terminal 50 of the user (member) of the target vehicle 30 in advance, and information (hereinafter, referred to as "permission information") indicating the permission may be added to the member information of the member. In this case, in Step S601, determination may be made whether or not the permission information is included in the member information of the member. In the second embodiment, it is assumed that each member ID and each vehicle 30 (each in-vehicle device ID) are managed in association with each other (for example, correspondence information of the member ID and the in-vehicle device ID is stored in the auxiliary storage device 102 or the like).

In a case where the permission information is not included in the member information of the member (in S601, No), Step S602 and subsequent steps are not executed. In a case where the permission information is included in the member information of the member (in S601, Yes), the traveling mode selection unit 128 determines whether or not the "relationship status" of the target time slot is the "friend" or the "partner" in the learning result storage unit 155 corresponding to the target vehicle 30 (S602). In a case where the "relationship status" is neither the "friend" nor the "partner" (in S602, No), Step S603 and subsequent steps are not executed.

In a case where the "relationship status" is the "friend" or the "partner" (in S602, Yes), the traveling mode selection unit 128 acquires the "fellow passenger ID" that is stored concerning the target time slot in the learning result storage unit 155 corresponding to the target vehicle 30 (S603). That is, the member ID of the "friend" or the "partner" of the driver of the target vehicle 30 is acquired.

The traveling mode selection unit 128 acquires the "estimated destination" of the target time slot in the learning result storage unit 155 related to the vehicle 30 corresponding to the acquired member ID (S604).

The traveling mode selection unit 128 determines whether or not the "estimated destination" of the target time slot in the learning result storage unit 155 corresponding to the target vehicle 30 is the same as the "estimated destination" acquired in Step S604 (S605). In a case where the compared "estimated destination" are different (in S605, No), Step S606 is not executed.

In a case where the compared "estimated destination" are the same (in S605, Yes), the traveling mode selection unit 128 copies the value of the "traveling mode (current trip)" of the target time slot in the learning result storage unit 155 related to the vehicle 30 corresponding to the member ID acquired in Step S603 to the "traveling mode (next trip)" of the target time slot in the learning result storage unit 155 (FIG. 15) related to the target vehicle 30 (S606). That is, the "traveling mode (current trip)" of the vehicle 30 of the friend or the dating partner is copied to the "traveling mode (next trip)" of the target vehicle 30.

In the second embodiment, on a time slot when the value (traveling mode) of the "traveling mode (next trip)" is not selected concerning the target vehicle 30, the traveling mode may be selected in the first embodiment.

As described above, according to the second embodiment, a user of a certain vehicle can use the traveling mode of the vehicle 30 of a friend or a dating partner to the vehicle of the user. As a result, in a time slot when a friend or a dating partner is a fellow passenger of the target vehicle 30, it is possible to control the traveling mode of the vehicle of the user to the same traveling mode as the traveling mode of the vehicle 30 of the friend or the dating partner. That is, in a period during which a friend or a dating partner is highly likely to be a fellow passenger, it is possible to make the vehicle 30 travel in a traveling mode for the friend or the dating partner.

Next, a third embodiment will be described. In the third embodiment, points that are different from the first embodiment will be described. Points that are not particularly mentioned in the third embodiment may be the same as those in the first embodiment. In the third embodiment, the following content may be added to the whole of the first embodiment or the whole of the second embodiment.

In the third embodiment, an example where a traveling mode of a vehicle 30 to be allocated in a car sharing service is controlled will be described.

Figure 19:
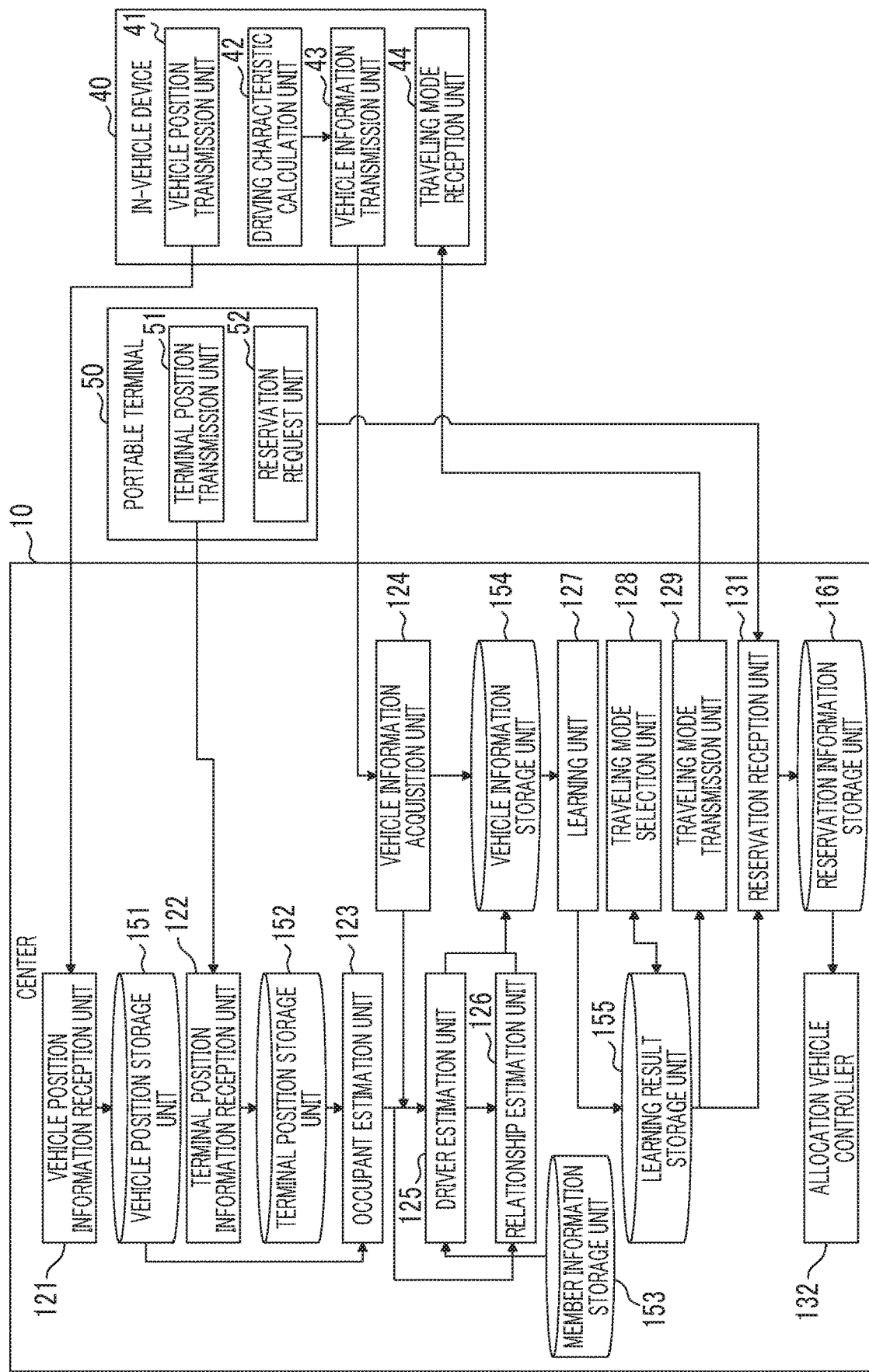
FIG. 19 is a diagram showing a functional configuration example of each device according to a third embodiment.

FIG. 19 is a diagram showing a functional configuration example of each device according to the third embodiment. In FIG. 19, the same portions as those in FIG. 3 are represented by the same reference numerals, and description thereof will not be repeated. In FIG. 19, the portable terminal 50 further has a reservation request unit 52. The reservation request unit 52 is realized, for example, by processing that is executed on the CPU of the portable terminal 50 by a program (for example, an application of a car sharing service, or the like) installed on the portable terminal 50. The reservation request unit 52 transmits a reservation request (hereinafter, referred to as a "vehicle allocation reservation request") of vehicle allocation to the center 10 according to an operation of the user of the portable terminal 50. In the vehicle allocation reservation request, the member ID of the user of the portable terminal 50 and a reserved time slot (start date and time, end date and time) of vehicle allocation, or the like is included.

The center 10 further has a reservation reception unit 131, an allocation vehicle controller 132, and the like. The above-described units are realized by processing that is executed on the CPU 104 by one or more programs installed on the center 10. The center 10 also uses a reservation information storage unit 161. The reservation information storage unit 161 can be realized, for example, using a storage device or the like that is connectable to the auxiliary storage device 102 or the center 10 through the network.

The reservation reception unit 131 decides a vehicle 30 to be a vehicle allocation target according to the vehicle allocation reservation request and stores reservation information on the vehicle 30 in the reservation information storage unit 161. Furthermore, the reservation reception unit 131 sets "traveling mode (current trip)" corresponding to the reserved time slot in the learning result storage unit 155 corresponding to the vehicle 30 related to the member ID included in the vehicle allocation reservation request in the reservation information on the vehicle 30 scheduled to be allocated. Accordingly, in the reservation information storage unit 161, reservation schedule information and a traveling mode corresponding to a time slot of each reservation are stored for each vehicle 30 to be a vehicle allocation target.

The allocation vehicle controller 132 controls the traveling mode of each vehicle 30 to be a vehicle allocation target based on the reservation information stored in the reservation information storage unit 161.

FIG. 20 is a flowchart illustrating an example of a processing procedure that the center 10 executes at the time of reservation of vehicle allocation according to the third embodiment.

In Step S701, the reservation reception unit 131 is on standby for reception of the vehicle allocation reservation request. When the vehicle allocation reservation request transmitted from the reservation request unit 52 of the portable terminal 50 of any member is received (in S701, Yes), the reservation reception unit 131 decides the vehicle 30 (allocation vehicle) to be a vehicle allocation target (S702). A decision logic of an allocation vehicle is not limited to a predetermined logic. For example, the reservation information storage unit 161 may be referred to, and a vehicle 30 having no reservation information stored in the reserved time slot (that is, a vehicle 30 that is not reserved) may be decided as a vehicle 30 to be a vehicle allocation target.

The reservation reception unit 131 stores the reservation information relating to the vehicle 30 decided as a vehicle allocation target in the reservation information storage unit 161 (S703).

FIG. 21 is a diagram showing a configuration example of the reservation information. In FIG. 21, reservation information of a certain allocation vehicle is shown. As shown in FIG. 21, the reservation information includes a traveling mode for each reserved time slot. On the reservation information that is stored in Step S703, a traveling mode is undecided at the point of time of Step S703.

The reservation reception unit 131 determines whether or not collaboration of the traveling mode with other vehicles is permitted with respect to a member related to the member ID included in the vehicle allocation reservation request (S704). The determination may be performed in the same manner as in Step S601 of FIG. 18.

In a case where collaboration of the traveling mode with other vehicles is permitted (in S704, Yes), the reservation reception unit 131 copies the "traveling mode (current trip)" of the time slot corresponding to the reserved time slot in the learning result storage unit 155 related to the vehicle 30 corresponding to the member to the "traveling mode" of the reservation information stored in Step S703 (S705). In this case where the period of the reserved time slot does not completely coincide with the period of the time slot in the learning result storage unit 155, the reserved time slot may be divided with granularity of the time slot of the learning result storage unit 155, and the "traveling mode (current trip)" of the corresponding time slot of the learning result storage unit 155 may be copied to each reserved time slot after division. That is, one piece of reservation information may be divided into a plurality of time slots.

FIG. 22 is a flowchart illustrating a processing procedure that the allocation vehicle controller 132 executes according to the third embodiment. In FIG. 22, although a certain piece of reservation information (hereinafter, referred to as "target reservation information") relating to a certain allocation vehicle (hereinafter, referred to as a "target vehicle 30") has been described, the processing procedure of FIG. 22 is executed for the reservation information of each allocation vehicle.

In Step S711, the allocation vehicle controller 132 is on standby until a predetermined time (for example, 10 minutes or the like) before a start time of the reserved time slot of the target reservation information (FIG. 21) comes. When the predetermined time before the start time comes (in S711, Yes), the allocation vehicle controller 132 compares the "traveling mode" (hereinafter, referred to as a "reserved traveling mode") of the target reservation information with the traveling mode (the traveling mode (hereinafter, referred to as a "current traveling mode") that is set in the target vehicle 30 at the present time) of reservation information before the target reservation information in a time-series order (S712).

In a case where the reserved traveling mode and the current traveling mode are different (in S712, Yes), the allocation vehicle controller 132 transmits a switching instruction to the reserved traveling mode to the in-vehicle device 40 of the target vehicle 30 (S713). The traveling controller 31 of the target vehicle 30 immediately switches the traveling mode of the target vehicle 30 to the reserved traveling mode according to the switching instruction.

As described above, according to the third embodiment, each user can use the vehicle 30 that is used (shared) by a plurality of users through the car sharing service in the same usage (that is, the traveling mode) as the vehicle 30 of the user. The traveling mode is switched before the start of the reserved time slot, whereby it is possible to realize smooth transition of the traveling mode between preceding and subsequent users.

Next, a fourth embodiment will be described. In the fourth embodiment, points that are different from the first embodiment will be described. Points that are not particularly mentioned in the fourth embodiment may be the same as those in the first embodiment.

In the fourth embodiment, an example where a traveling mode of a transport vehicle, such as a vehicle 30 (truck or the like) for use in home delivery is controlled will be described.

FIG. 23 is a diagram showing a functional configuration example of each device according to the fourth embodiment. In FIG. 23, the center 10 also has a delivery information reception unit 141, a transport vehicle controller 142, and the like. The above-described units are realized by processing that is executed on the CPU 104 by one or more programs installed on the center 10. The center 10 further uses a cargo information storage unit 171. The cargo information storage unit 171 can be realized, for example, by a storage device or the like that is connectable to the auxiliary storage device 102 or the center 10 through the network.

The delivery information reception unit 141 receives delivery information from a terminal that is carried with a driver of a transport vehicle. The delivery information refers to information including identification information (hereinafter, referred to as a "person-in-charge ID") of the driver and identification information (hereinafter, referred to as a "cargo ID") of a delivered cargo. That is, each time a cargo is delivered, the driver inputs, to the terminal, that delivery of the cargo ends. The terminal transmits the cargo ID of the cargo and the person-in-charge ID to the delivery information reception unit 141. When the delivery information is received, the delivery information reception unit 141 records information indicating that the cargo related to the cargo ID included in the delivery information has been delivered, in cargo information stored in the cargo information storage unit 171 in association with the person-in-charge ID included in the delivery information. That is, in the cargo information storage unit 171, the cargo information is stored for each person-in-charge ID. The cargo information refers to information including the cargo ID, attribute information, and the like for each of all cargos that are loaded on the transport vehicle of the driver. In the attribute information of each cargo, a weight, information indicating whether or not the cargo is a frozen commodity, and the like are included.

The transport vehicle controller 142 controls the traveling mode of the transport vehicle in real time according to the situation of the cargo loaded on the transport vehicle.

FIG. 24 is a flowchart illustrating an example of a processing procedure that the center 10 executes according to the fourth embodiment.

When delivery information is received from a terminal that is carried with a driver of any transport vehicle (hereinafter, referred to as "target vehicle 30") (in S801, Yes), the delivery information reception unit 141 updates the cargo information stored in the cargo information storage unit 171 in association with a person-in-charge ID included in the delivery information (S802). That is, the delivery information reception unit 141 records information indicating that a cargo related to a cargo ID included in the delivery information has been delivered in a record corresponding to the cargo ID in the cargo information. As a result, it is possible to specify a cargo ID among the cargo IDs included in the cargo information to an undelivered cargo.

The transport vehicle controller 142 determines whether or not there is a frozen commodity in the undelivered cargo or whether or not the total weight of the undelivered cargo is greater than 3 t and equal to or less than 4 t with reference to the cargo information (S803). In a case where there is a frozen commodity in the undelivered cargo or in a case where the total weight of the undelivered cargo is greater than 3 t and equal to or less than 4 t (in S803, Yes), the transport vehicle controller 142 transmits a switching instruction to the "comfort priority mode" to the in-vehicle device 40 of the target vehicle 30 (S804).

In a case where there is no frozen commodity in the undelivered cargo, and the total weight of the undelivered cargo is equal to or less than 3 t (in S803, No), the transport vehicle controller 142 determines whether or not the total weight of the undelivered cargo is greater than 2.25 t (S805). In a case where the total weight of the undelivered cargo is greater than 2.25 t (in S805, Yes), the transport vehicle controller 142 transmits a switching instruction to the "50-50 mode" to the in-vehicle device 40 of the target vehicle 30 (S806).

In a case where the total weight of the undelivered cargo is equal to or less than 2.25 t (in S805, No), the transport vehicle controller 142 transmits a switching instruction to the "fuel efficiency priority mode" to the in-vehicle device 40 of the target vehicle 30 (S807).

The traveling controller 31 of the transport vehicle mounted with the in-vehicle device 40 receiving the switching instruction transmitted from the transport vehicle controller 142 immediately switches the traveling mode according to the switching instruction.

As described above, according to the fourth embodiment, it is possible to switch the traveling mode of the vehicle 30 in real time according to the situation of the cargo loaded on the vehicle 30. As a result, it is possible to make the vehicle 30 travel in a traveling mode appropriate for a loading situation.

The correspondence of the situation of the cargo and the traveling mode shown in FIG. 24 is merely an example.

The fourth embodiment may be carried out in combination with the first to third embodiments.

In the respective embodiments, although the description has been provided on the assumption of the stop and start function, the respective embodiments may be applied to control of traveling mode in a hybrid vehicle, an electric vehicle, a hydrogen fuel vehicle, or the like.

In the respective embodiments, the center 10 is an example of an information processing apparatus. The driver estimation unit 125 is an example of a first estimation unit and a third estimation unit. The relationship estimation unit 126 is an example of a second estimation unit. The traveling mode selection unit 128 is an example of a selection unit. The vehicle information acquisition unit 124 is an example of a first reception unit. The terminal position information reception unit 122 is an example of a second reception unit. The member information storage unit 153 is an example of a storage unit.

Although the embodiment of the disclosure has been described above in detail, the disclosure is not limited to such a specific embodiment, and various modifications and alterations may be made without departing from the spirit and scope of the disclosure described in the claims.

What is claimed is:

1. An in-vehicle information processing apparatus mounted in a vehicle including a processor for executing programs stored in memory, the processor configured to:

estimate whether a fellow passenger is included in occupants of the vehicle, when the fellow passenger is included in the occupants, acquire information relating to a driver of the vehicle and information relating to the fellow passenger and estimate a relationship between the driver and the fellow passenger based on the acquired information, and select a control relating to traveling of the vehicle according to the relationship, wherein the processor is configured to select a comfort priority mode giving priority to comfort when a degree of intimacy between the driver and the fellow passenger is low, wherein the processor is configured to select a fuel efficiency priority mode giving priority to fuel efficiency when a degree of intimacy between the driver and the fellow passenger is high, and wherein the processor is configured to further receive positional information of the vehicle from a global positioning system of the in-vehicle device, wherein the relationship is one of a family, a friend, a dating partner, and a co-worker, wherein the degree of intimacy between the driver and the fellow passenger is low when the fellow passenger is an acquaintance or short term friend, short term dating partner, or a superior co-worker, and wherein the degree of intimacy between the driver and the fellow passenger is high when the fellow passenger is a best friend, long term dating partner, or a subordinate co-worker.

2. The information processing apparatus according to claim 1, wherein:

the processor is configured to further-receive, from a plurality of portable terminals, positional information of the portable terminals; and the processor is configured to estimate the occupants based on the positional information of the vehicle and the positional information of the portable terminals.

3. The information processing apparatus according to claim 2, wherein the processor is configured to receive cargo delivery information with the vehicle from the portable terminals of the occupants and update cargo information of the vehicle, and the processor is configured to select a control of the vehicle based on a situation of an undelivered cargo.

4. The information processing apparatus according to claim 3, wherein the processor is configured to, as the control of the vehicle, i) select a comfort priority mode in which comfort of the occupants are given priority when a frozen commodity is included in the undelivered cargo or when a total weight of the undelivered cargo is within a predetermined range, ii) select a fuel efficiency priority mode in which fuel efficiency is given priority when the frozen commodity is not included in the undelivered cargo, the total weight is outside the predetermined range, and the total weight is equal to or less than a first predetermined value, and iii) select a 50-50 mode that is a control intermediate between the fuel efficiency priority mode and the comfort priority mode when the frozen commodity is not included in the undelivered cargo, the total weight is outside the predetermined range, and the total weight is greater than the first predetermined value.

5. The information processing apparatus according to claim 1, further comprising a storage unit configured to store information indicating a driving characteristic acquired from the vehicle and information indicating a driving characteristic for each of the occupants, wherein the processor is configured to estimate a driver from among the occupants based on information stored in the storage unit.

6. The information processing apparatus according to claim 5, wherein:

the storage unit is configured to store a relationship status between the driver and the fellow passenger in each time slot of a weekday and a holiday; and the processor is configured to determine the relationship between the driver and the fellow passenger based on the relationship status in a target time slot.

7. The information processing apparatus according to claim 5, wherein the processor is configured to receive a vehicle allocation reservation request from a portable terminal of a member, when the vehicle allocation reservation request is received, store a reservation information in the storage unit, determine whether collaboration with other vehicles is permitted with respect to the member included in the vehicle allocation reservation request, and when it is determined that the collaboration is permitted, copy a control relating to traveling of a vehicle corresponding to the member of a reserved time slot to the reservation information.

8. The information processing apparatus according to claim 1, wherein the processor is configured to estimate the relationship between the driver and the fellow passenger based on commonality between personal information relating to the driver and personal information relating to the fellow passenger or based on a content of an address book stored in a portable terminal of each of the driver and the fellow passenger.

9. The information processing apparatus according to claim 1, wherein the processor is configured to, when the relationship is the family, select a control of the vehicle based on whether an infant or an aged person is included in the fellow passenger.

10. The information processing apparatus according to claim 1, wherein the control relating to traveling of the vehicle includes a fuel efficiency priority mode in which fuel efficiency is given priority, a comfort priority mode in which comfort of the occupants is given priority, a 50-50 mode that is a control intermediate between the fuel efficiency priority mode and the comfort priority mode, and a charging mode in which charging of a battery is given priority.

11. An information processing method that a computer executes based on instructions stored in memory, the information processing method comprising:

estimating whether a fellow passenger is included in occupants of a vehicle;

when the fellow passenger is included in the occupants, acquiring information relating to a driver of the vehicle and information relating to the fellow passenger and estimating a relationship between the driver and the fellow passenger based on the acquired information;

selecting a control relating to traveling of the vehicle according to the relationship;

selecting a comfort priority mode giving priority to comfort when a degree of intimacy between the driver and the fellow passenger is low; and selecting a fuel efficiency priority mode for the vehicle giving priority to fuel efficiency when a degree of intimacy between the driver and the fellow passenger is high, wherein the relationship is one of a family, a friend, a dating partner, and a co-worker, wherein the degree of intimacy between the driver and the fellow passenger is low when the fellow passenger is an acquaintance or short term friend, short term dating partner, or a superior co-worker, and wherein the degree of intimacy between the driver and the fellow passenger is high when the fellow passenger is a best friend, long term dating partner, or a subordinate co-worker.

\* \* \* \* \*